United States Patent
Jones et al.

(10) Patent No.: US 9,199,669 B2
(45) Date of Patent: Dec. 1, 2015

(54) VEHICLE FRONT END STRUCTURE

(71) Applicant: Nissan North America, Inc., Franklin, TN (US)

(72) Inventors: Adam Michael Jones, Farmington Hills, MI (US); Ramkrishna Jayaram Chunduri, Troy, MI (US)

(73) Assignee: Nissan North America, Inc., Franklin, TN (US)

( * ) Notice: Subject to any disclaimer, the term of this patent is extended or adjusted under 35 U.S.C. 154(b) by 26 days.

(21) Appl. No.: 13/797,498

(22) Filed: Mar. 12, 2013

(65) Prior Publication Data

US 2014/0265451 A1    Sep. 18, 2014

(51) Int. Cl.
*B62D 25/00* (2006.01)
*B62D 25/08* (2006.01)
*B62D 21/15* (2006.01)

(52) U.S. Cl.
CPC ............ *B62D 25/082* (2013.01); *B62D 21/152* (2013.01); *B62D 21/155* (2013.01)

(58) Field of Classification Search
CPC .. B62D 21/152; B62D 25/085; B62D 25/082; B62D 21/155
USPC .......... 180/68.4; 296/193.09, 203.02, 194, 30
See application file for complete search history.

(56) References Cited

U.S. PATENT DOCUMENTS

| | | | |
|---|---|---|---|
| 4,886,314 A * | 12/1989 | Maeda | 296/192 |
| 6,715,573 B2 * | 4/2004 | Emori et al. | 180/68.4 |
| 7,407,220 B2 * | 8/2008 | Kanagawa et al. | 296/187.09 |
| 2012/0313360 A1 | 12/2012 | Akaki et al. | |
| 2012/0319336 A1 | 12/2012 | Yamada et al. | |
| 2013/0081897 A1 | 4/2013 | Dandekar et al. | |

* cited by examiner

*Primary Examiner* — Joseph D Pape
*Assistant Examiner* — Dana Ivey
(74) *Attorney, Agent, or Firm* — Global IP Counselors, LLP

(57) ABSTRACT

A vehicle front end structure includes a front side member, a hood ledge and a hood ledge reinforcement. The front side member extends in a vehicle longitudinal direction. The hood ledge has a forward end fixedly attached to a forward section of the front side member. The hood ledge extends upwardly and laterally outward from the forward section of the front side member in a vehicle rearward direction. The hood ledge reinforcement includes a lower section fixedly attached to an outboard surface of the front side member. The upper section is fixedly attached to an underside of the hood ledge, and at least one brace is fixedly attached to both the lower and upper sections.

18 Claims, 27 Drawing Sheets

VEHICLE FRONT END STRUCTURE

BACKGROUND

1. Field of the Invention

The present invention generally relates to a vehicle front end structure of a vehicle. More specifically, the present invention relates to a vehicle front end structure that includes a hood ledge reinforcement configured to receive impacting force as the vehicle with forward velocity impacts a rigid barrier and redirect at least a portion of the forward velocity into a lateral velocity that moves the vehicle in a lateral direction away from the rigid barrier.

2. Background Information

Vehicle body structures are regularly being redesigned to include structural features that absorb impact forces in response to impact events. Recently introduced impact event tests include a small overlap test where a vehicle is provided with velocity in a vehicle longitudinal direction such that a front corner of the vehicle (approximately 25 percent of the overall width of the vehicle) impacts a fixed, rigid barrier. FIGS. 1, 2 and 3 schematically show an example of a conventional vehicle C undergoing an impact event with a fixed barrier B in accordance with the small overlap test.

FIG. 1 shows the conventional vehicle C approaching the rigid barrier B in the small overlap test. FIG. 2 shows the conventional vehicle C just after initial impact with the rigid barrier B showing initial deformation and the velocity of the vehicle C being partially transformed into rotational displacement about the rigid barrier B. FIG. 3 shows the conventional vehicle C undergoing further deformation as a result of the impact event, and undergoing further rotational displacement about the rigid barrier B such that a rear end of the conventional vehicle C swings laterally and outwardly away from the rigid barrier B.

SUMMARY

One object is to reduce or eliminate rotational displacement experienced by a forward moving vehicle during an impact event with a rigid barrier in a frontal offset test.

Another object is to redirect impact force experienced by a forward moving vehicle during an impact event with a rigid barrier in a frontal offset test such that the redirected force causes the entire vehicle to move laterally away from the rigid barrier.

In view of the state of the known technology, one aspect of the present disclosure is to provide a vehicle front end structure with a front side member, a hood ledge and a hood ledge reinforcement. The front side member extends in a vehicle longitudinal direction. The hood ledge has a forward end fixedly attached to a forward section of the front side member. The hood ledge extends upwardly and laterally outward from the forward section of the front side member in a vehicle rearward direction. The hood ledge reinforcement includes a lower section fixedly attached to an outboard surface of the front side member. The upper section is fixedly attached to an underside of the hood ledge, and at least one brace is fixedly attached to both the lower and upper sections.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 4-14, a vehicle 10 is illustrated in accordance with a first embodiment. In the first embodiment, the vehicle 10 includes a plurality of force redirecting features (described below) that alter the response the vehicle 10 experiences when subjected to a small overlap test. Specifically, each of the plurality of force redirecting features described below, whether used individually, or in combination with one another, receive impacting force applied to the vehicle 10 as it moves forward and impacts a fixed barrier B, and redirects at least a portion of the impacting force into a lateral component of force that causes the vehicle 10 to move laterally away from the fixed barrier B.

Figure 1:
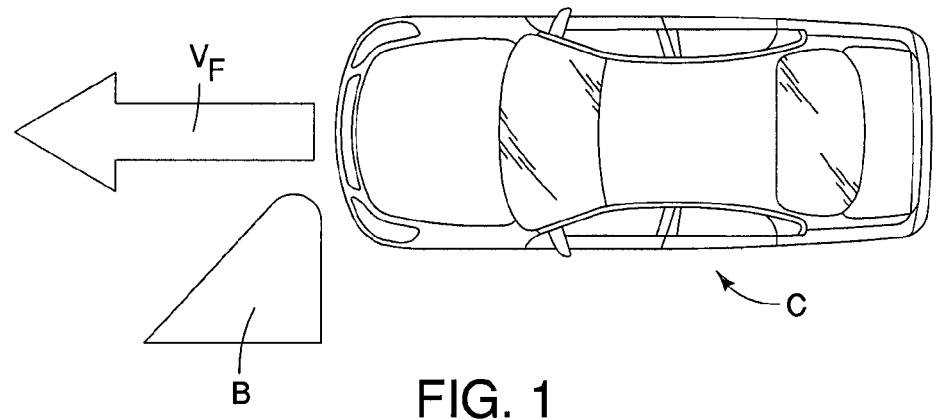
FIG. 1 is a schematic view of a conventional moving vehicle showing its response to a small overlap test where a front corner of the vehicle is aligned with a fixed, rigid barrier for eventual impact with the barrier.
Figure 2:
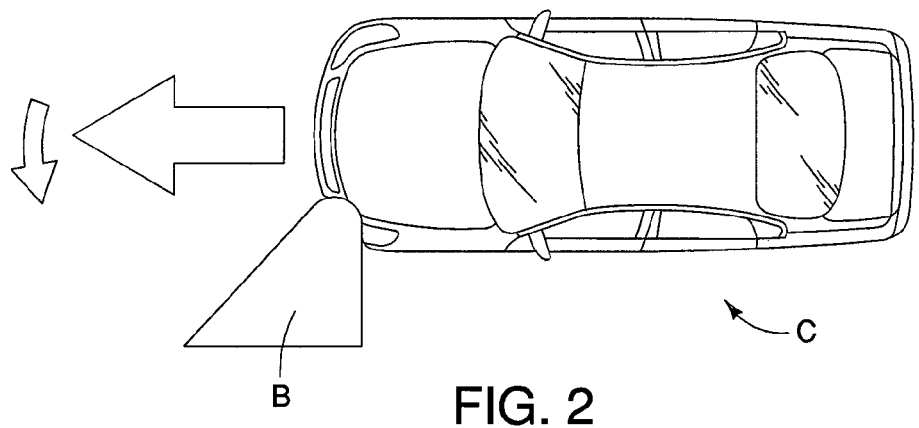
FIG. 2 is another schematic view of the conventional vehicle showing its response to the small overlap test at the beginning of an impact event with the front corner of the conventional vehicle impacting the barrier and beginning to undergo deformation.
Figure 3:
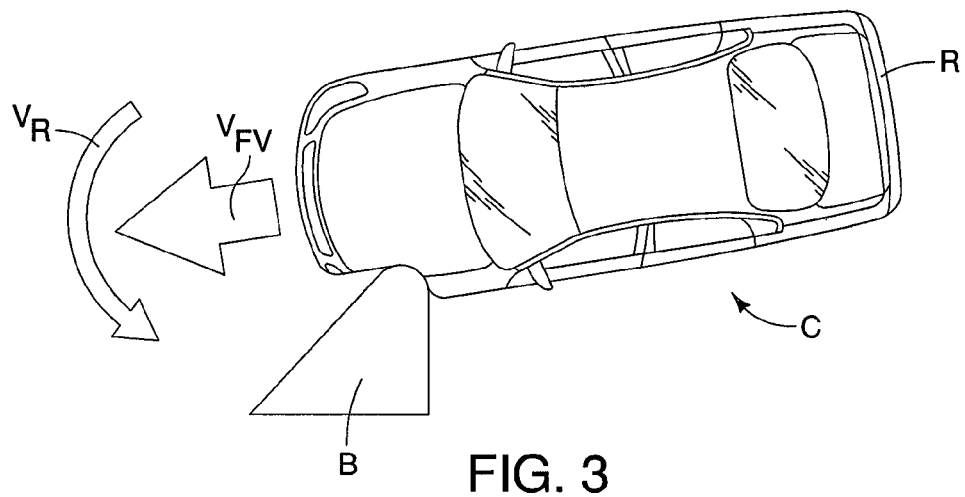
FIG. 3 is still another schematic view of the conventional vehicle showing its response to the small overlap test with the conventional vehicle undergoing further deformation during the impact event, with a portion of the impacting force being transformed into rotational movement with the vehicle rotating about a point proximate the area of impact such that the rear of the conventional vehicle swings outward away from the barrier.

The Insurance Institute for Highway Safety (IIHS) has developed various tests where vehicles are provided with forward velocity $V_F$ and impacted against fixed, rigid barriers, like the rigid barrier B depicted in FIGS. 1-3. In the IIHS offset tests, the conventional vehicle C is aimed at the rigid barrier B such that approximately 25 percent of the front of the conventional vehicle C impacts the rigid barrier B. In other words, as indicated in FIGS. 1-3, only a front corner of the conventional vehicle C impacts the rigid barrier B. This IIHS test is also known as a narrow offset, or small overlap test. In such tests, a front bumper assembly of the conventional vehicle C is either not impacted, or undergoes only limited contact with the rigid barrier B during the impact event. When the vehicle C is provided with velocity and impacts the rigid barrier B, the rapid deceleration of the vehicle C transforms the kinetic energy associated with the mass and velocity of the vehicle C into deformation of the vehicle C and counter movement of the vehicle C. As is well known, kinetic energy is a function of mass times the square of velocity. During the small offset test, the kinetic energy of the vehicle C is partially absorbed and partially transformed into other forms of kinetic energy, such as further motion. Therefore, structures at the front of the conventional vehicle C that impact the rigid barrier B absorb much of the impacting force that results from the impact event.

The small overlap test is represented schematically in FIGS. 1-3. During the impact event, a variety of structures undergo deformation. This deformation is not explicitly depicted in FIGS. 2 and 3 with any degree of accuracy because such deformation varies from conventional vehicle to conventional vehicle, depending upon the overall design of the front structure of the conventional vehicle C. Instead, in FIG. 3, the conventional vehicle C is depicted with a generic degree of deformation as a result of the impact event. However, the conventional vehicles tested by the IIHS using the small overlap test have a relatively consistent response. Specifically, during the impact event with the rigid barrier B, a portion of the kinetic energy of the vehicle C is partially absorbed by deformation of structures of the vehicle C and another portion of the kinetic energy of the vehicle C is transformed into rotational movement of the rear end R of the conventional vehicle C such that it swings laterally away from the rigid barrier B, as indicated in FIG. 3. In other words, a portion of the velocity $V_F$ of the conventional vehicle C is transformed during the impact event. Specifically, a portion of the force $V_F$ transmitted to the conventional vehicle C during the impact event is at least partially transformed into a rotational component of force, or angular velocity $V_R$, as indicated in FIG. 3. The force redirecting features of the various embodiments described hereinbelow, when used in the vehicle 10, reduce or eliminate the rotational force that results, as well as decreasing the contact time and force transferred rearward in the longitudinal direction of the vehicle, in the conventional vehicle C during the small overlap test.

It should be understood from the drawings and the description hereinbelow, that in conventional vehicle structures, such as a front bumper assembly and the strut tower, the conventional vehicle structures are configured to absorb impact energy, in particular during an impact event where the point of impact overlaps with front end structures which include the front bumper assembly, the front side member and front suspension elements. In the various embodiments described below, the plurality of force redirecting features are designed not to absorb the impact forces during the small overlap test, but rather are configured to define ramping surfaces that are angled to deflect the rigid barrier B. The ramping surfaces described below, define angled surfaces that contact the rigid barrier B, resist deformation (there may be some deformation) thereby redirecting at least a portion of the forward velocity of the vehicle 10 into lateral movement of the vehicle 10. In other words, kinetic energy or inertia of the vehicle 10 is transformed or redirected by the ramping surfaces into lateral movement, guiding and moving the vehicle 10 in a lateral direction away from the rigid barrier B.

Figure 4:
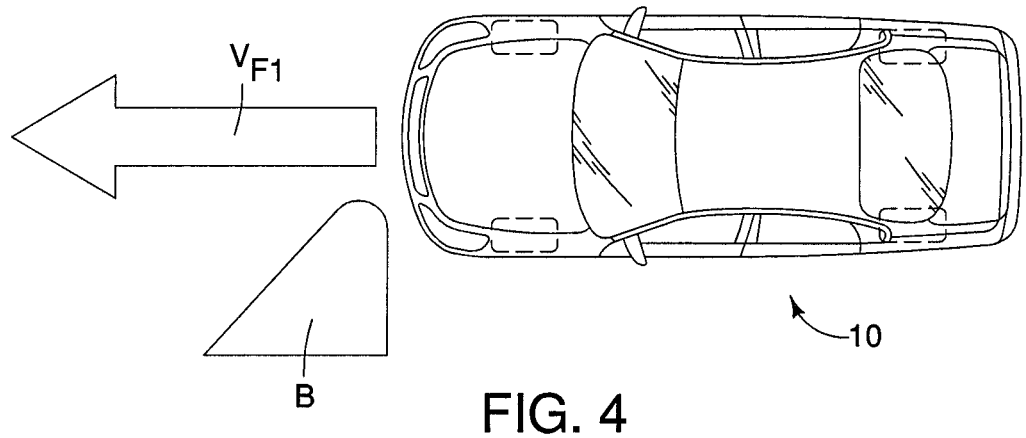
FIG. 4 is a schematic view of a moving vehicle in accordance with at least one embodiment showing its response to a small overlap test where approximately 25 percent of the front of the vehicle is aligned with a fixed, rigid barrier for eventual impact with the barrier in accordance with various embodiments.

As is described in greater detail below, the vehicle 10 is provided with the plurality of force redirecting features. One unexpected benefit of the plurality of force redirecting features of the vehicle 10 (described below), is that unlike the conventional vehicle C, during the small overlap test, the rear end of the vehicle 10 undergoes a noticeable reduction of rotation and hence the rear end of the vehicle 10 is not observed swinging laterally away from the rigid barrier B at the conclusion of the small overlap test, as indicated in FIG. 4-6.

Figure 5:
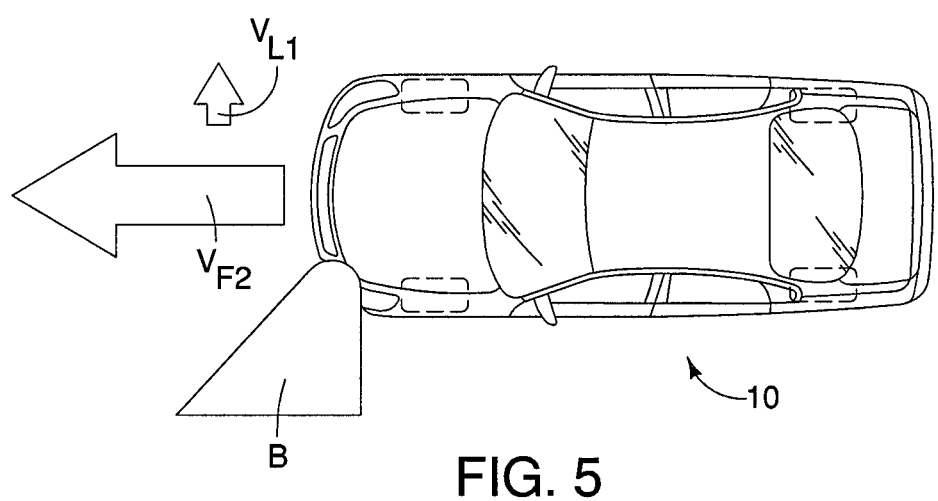
FIG. 5 is another schematic view of the vehicle depicted in FIG. 4 showing an initial response to the impact event of the small overlap test with a front corner of the vehicle impacting the barrier and beginning to undergo deformation in accordance with the various embodiments.
Figure 6:
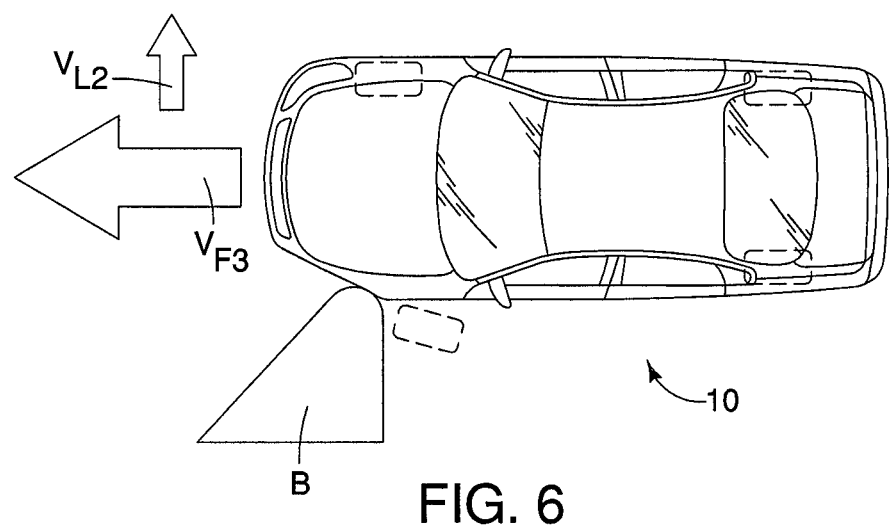
FIG. 6 is still another schematic view of the vehicle depicted in FIGS. 4 and 5 showing a subsequent response to the impact event of the small overlap test with the moving vehicle undergoing further deformation during the impact event and with the vehicle moving laterally away from the barrier in accordance with the at least one embodiment.

Rather, during the impact event with the rigid barrier B, a portion of the kinetic energy or velocity $V_{F1}$ acting on the vehicle 10 is redirected such that the entire vehicle 10 (front end and rear end) moves laterally away from the rigid barrier B, as indicated in FIGS. 5 and 6. Early in the impact event, the velocity $V_{F1}$ (FIG. 4) of the vehicle 10 begins to be redirected or deflected by force redirecting features of the vehicle 10, resulting in a slightly reduced velocity $V_{F2}$ in FIG. 5. The reduction of the velocity $V_{F1}$ to the velocity $V_{F2}$ results in a lateral velocity $V_{L1}$, as indicated in FIG. 5. As shown in FIG. 6, as the impact event continues, the forward velocity $V_{F1}$ is further transformed by the vehicle 10 resulting in a smaller forward velocity $V_{F3}$ and a larger lateral velocity $V_{L2}$. The lateral velocity $V_{L2}$ translates directly into lateral movement of the vehicle 10.

Little, if any, of the forward velocity $V_{F1}$ acting on the vehicle 10 is redirected into a rotational movement. Rather, kinetic energy associated with the forward velocity $V_{F1}$ of the vehicle 10 is at least partially redirected into the lateral velocity $V_{L2}$ that results in movement of both the front and rear of the vehicle 10 laterally away from the rigid barrier B. Further, it should be understood from the drawings and description herein, that the forward velocity $V_{F3}$ of the vehicle 10 depicted in FIG. 6 can potentially be greater than the forward velocity $V_{FV}$ of the conventional vehicle C, where the vehicle C is similar to the vehicle 10, but where the vehicle C does not include any of the force redirecting features of the vehicle 10. Specifically, the conventional vehicle C typically absorbs a significant portion of the kinetic energy corresponding to the initial velocity $V_F$ of the vehicle C during the small offset test.

At the conclusion of the impact event with the rigid barrier B, the final velocity $V_{FV}$ of the conventional vehicle C is typically very small. However, in the vehicle 10 having one or more of the force redirecting features described below, less kinetic energy is absorbed by the vehicle 10 as compared to the vehicle C, and at least a portion of the kinetic energy of the vehicle 10 is deflected or redirected into lateral movement. Since the vehicle 10 has moved laterally away from the rigid barrier B at the conclusion of the small offset test, the vehicle 10 can retain much of the initial kinetic energy as forward velocity $V_{F3}$. As should be clear from the description hereinbelow, the phrases "impact force", "impacting force" and "forward force" are used interchangeably and refer to the kinetic energy associated with the velocity $V_{F1}$ of the applied to the vehicle 10 in the vehicle longitudinal direction L during the small overlap test. In other words, during, in the small overlap test depicted in FIGS. 4-6, the vehicle 10 is provided with velocity and is impacted against the rigid barrier B. In an ideal running of the small overlap test, all of the kinetic energy associated with the velocity of the vehicle 10 at initial impact with the rigid barrier is in the vehicle longitudinal direction L, since the vehicle 10 is only provided with forward motion in the vehicle longitudinal direction L. Theoretically, in the small overlap test, there are no lateral forces acting on the vehicle 10 prior to impact with the rigid barrier B. Hence, all lateral velocity and lateral movement of the vehicle 10 is a result of the impact between the vehicle 10 and the rigid barrier B. The plurality of force redirecting features of the vehicle 10 described below are configured and arranged to deflect the rigid barrier B and redirect at least a portion of the velocity (and associated kinetic energy) of the vehicle 10 into lateral movement of the vehicle 10 away from the rigid barrier B.

Figure 7:
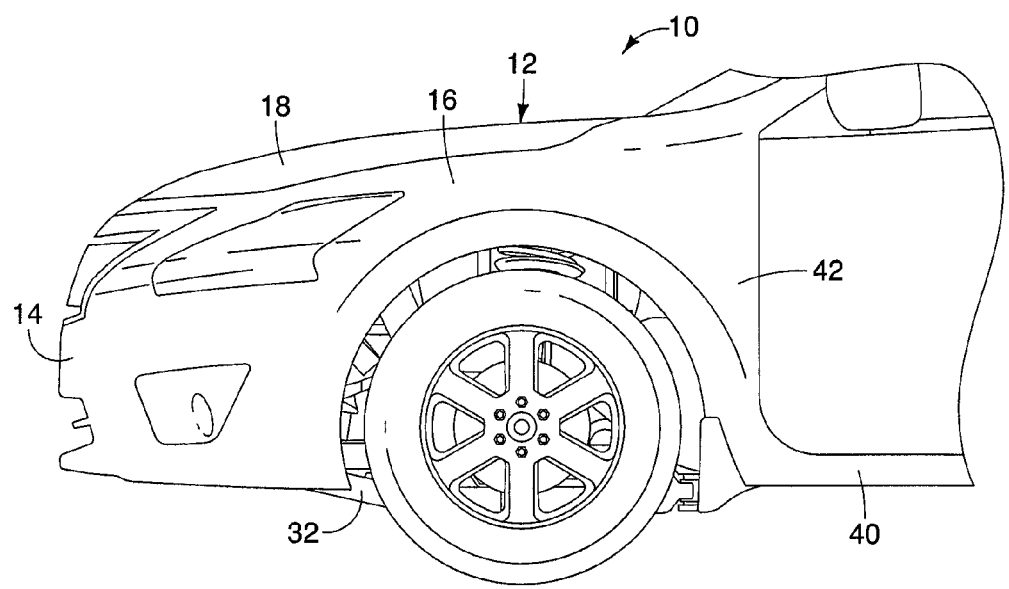
FIG. 7 is side view of a front end of the vehicle in accordance with a first embodiment.

A description of the plurality of force redirecting features is now provided with initial reference to FIGS. 7-14. As shown in FIG. 7, the vehicle 10 includes a front end structure 12 with a bumper assembly 14, a side fender 16 and an engine hood 18 that at least partially cover and conceal many of the structural elements that make up the front end structure 12. FIGS. 8-14 are various views of the vehicle 10 with the bumper assembly 14, the side fender 16 and the engine hood 18 removed to reveal portions of the front end structure 12 and the plurality of force redirecting features of the vehicle 10.

As shown in FIGS. 8-14, the plurality of force redirecting features of the vehicle 10 include a force receiving member 20 (a force receiving structure), a lateral energy transfer member 22 and a hood ledge reinforcement 24. The force receiving member 20, the lateral energy transfer member 22 and the hood ledge reinforcement 24 are all described in greater detail below following a brief description of the front end structure 12 of the vehicle 10.

As shown in FIGS. 8-14, the front end structure 12 includes a variety of components, but in particular includes elements of a body structure 30 and an engine cradle 32.

A description of related elements of the body structure 30 is now provided. Each side of the body structure 30 includes at least the following: a sill 40, an A-pillar 42, panels that make up a dash wall 44, a front side member 46 and a hood ledge 48. However, since the two sides (driver's side and passenger's side) of the body structure 30 are typically identical, but mirror images of one another, description of one side only is provided for the sake of brevity. However, the description of the one side of the body structure 30 applies equally to both sides of the body structure 30.

The sill 40 is a conventional rigid body construct typically made from a plurality of panels that have been shaped and welded together to form the sill 40. The sill 40 extends from a lower end of the A-pillar 42, rearward and under a door opening of the vehicle 10. The A-pillar 42 is similarly a conventional rigid body construct typically made from a plurality of panels that have been shaped and welded together to form the A-pillar 42. The A-pillar 42 is rigidly attached to an upper front end of the sill 40 and extends upward defining a front end of the door opening. Alternatively, the sill 40 and the A-pillar 42 can be made from common elements such that there are few or no seams that divide the sill 40 from the A-pillar 42. The dash wall 44 extends from A-pillar 42 on the driver's side of the vehicle to the A-pillar on the passenger's side (not shown) of the vehicle 10. The dash wall 44 separates an engine compartment of the vehicle 10 from a passenger compartment of the vehicle 10, in a conventional manner.

Figure 10:
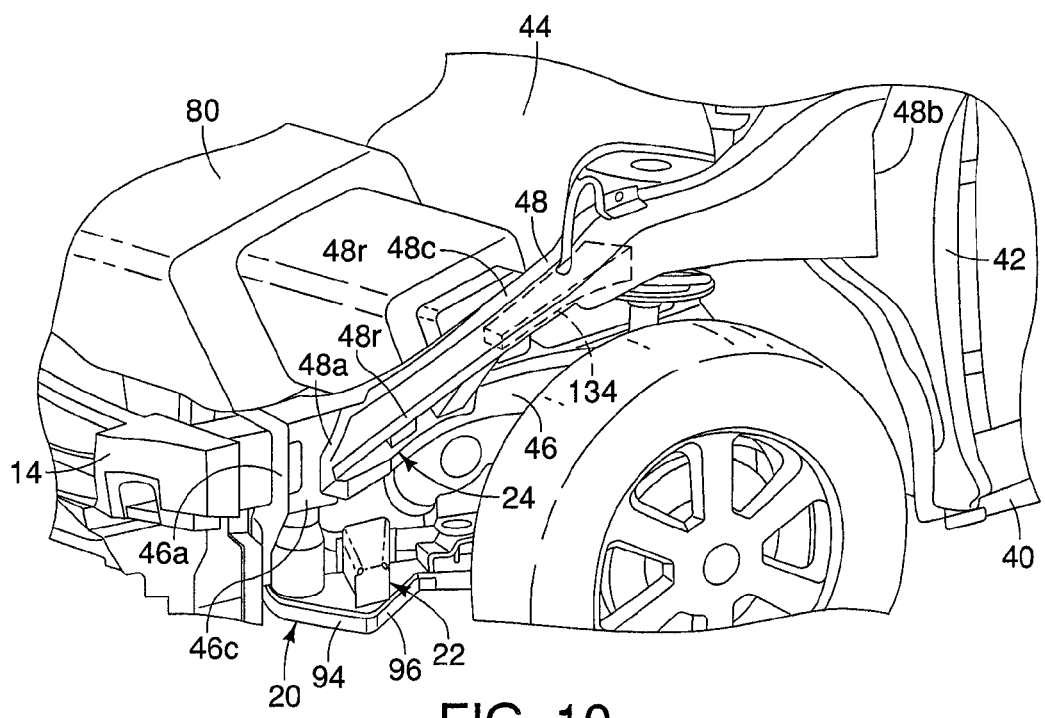
FIG. 10 is a perspective view of the front end of the vehicle with fenders removed showing the force receiving member, the lateral energy transfer member, the hood ledge and the hood ledge reinforcement, in accordance with the first embodiment.
Figure 11:
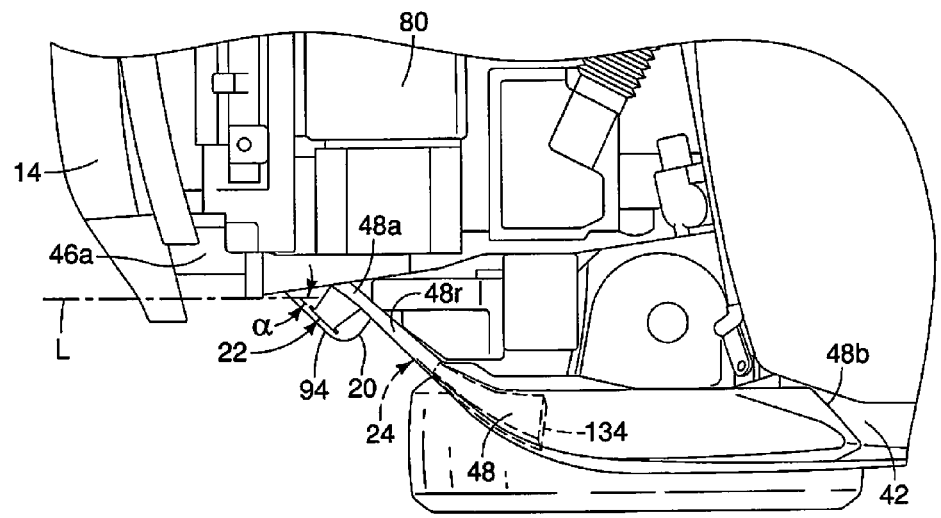
FIG. 11 is a top view of the front end of the vehicle with fenders and hood removed showing a portion of the force receiving member, a portion of the lateral energy transfer member and the hood ledge concealing the hood ledge reinforcement, in accordance with the first embodiment.
Figure 12:
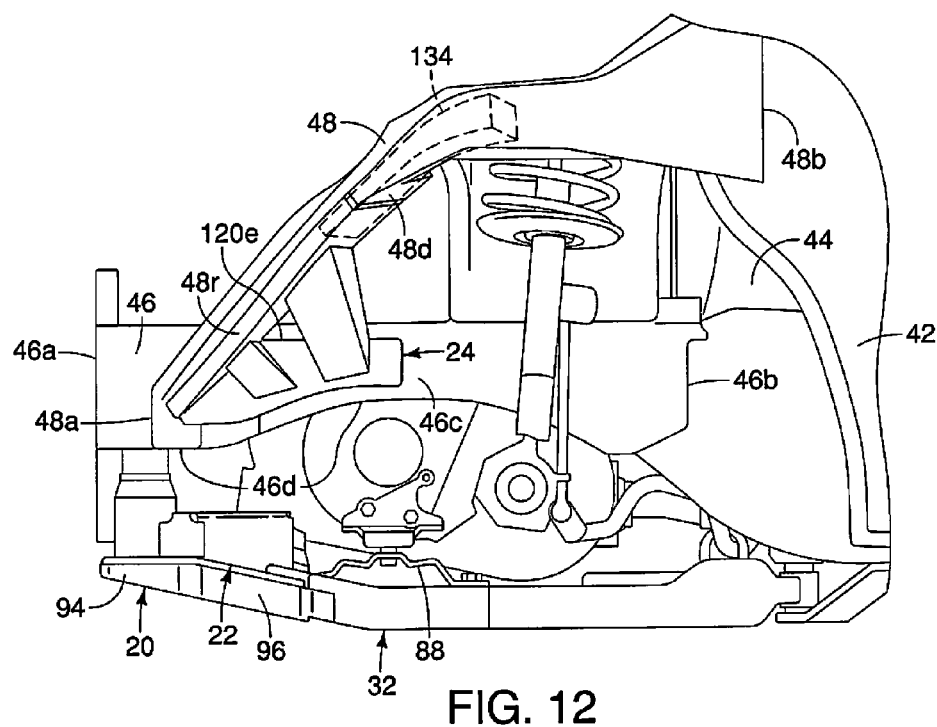
FIG. 12 is another side view of the front end of the vehicle with fenders, wheel and several suspension components removed showing the force receiving member, the lateral energy transfer member and the hood ledge reinforcement, in accordance with the first embodiment.
Figure 13:
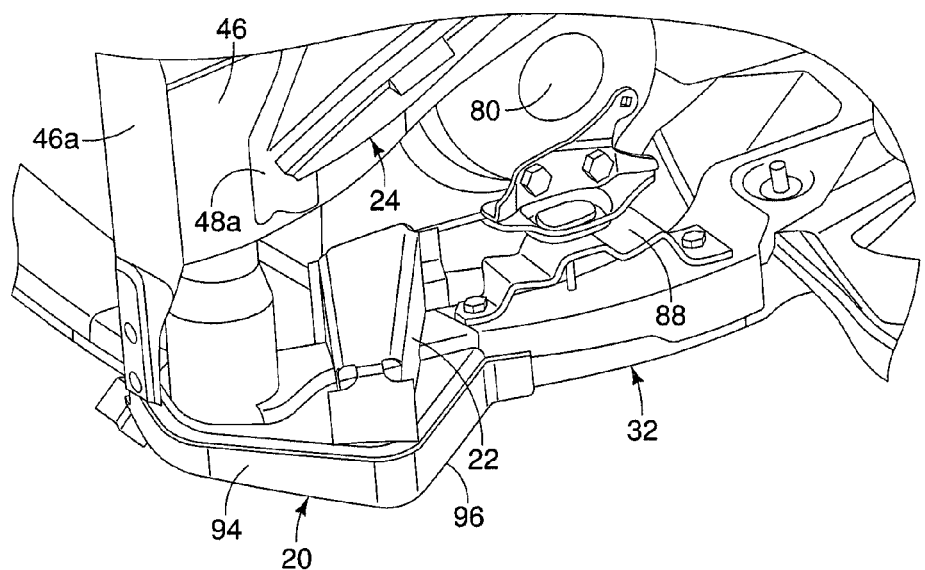
FIG. 13 is another perspective view of the front end of the vehicle with fenders removed showing the force receiving member, the lateral energy transfer member, the hood ledge and the hood ledge reinforcement, in accordance with the first embodiment.
Figure 14:
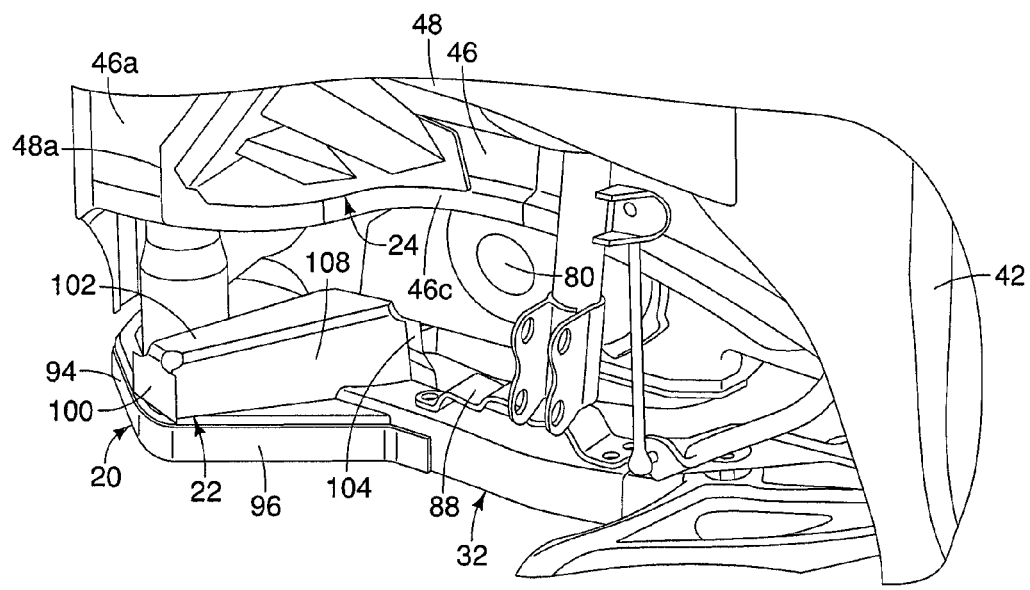
FIG. 14 is still another perspective view of the front end of the vehicle with fenders removed showing the force receiving member, the lateral energy transfer member, the hood ledge and the hood ledge reinforcement, in accordance with the first embodiment.
Figure 21:
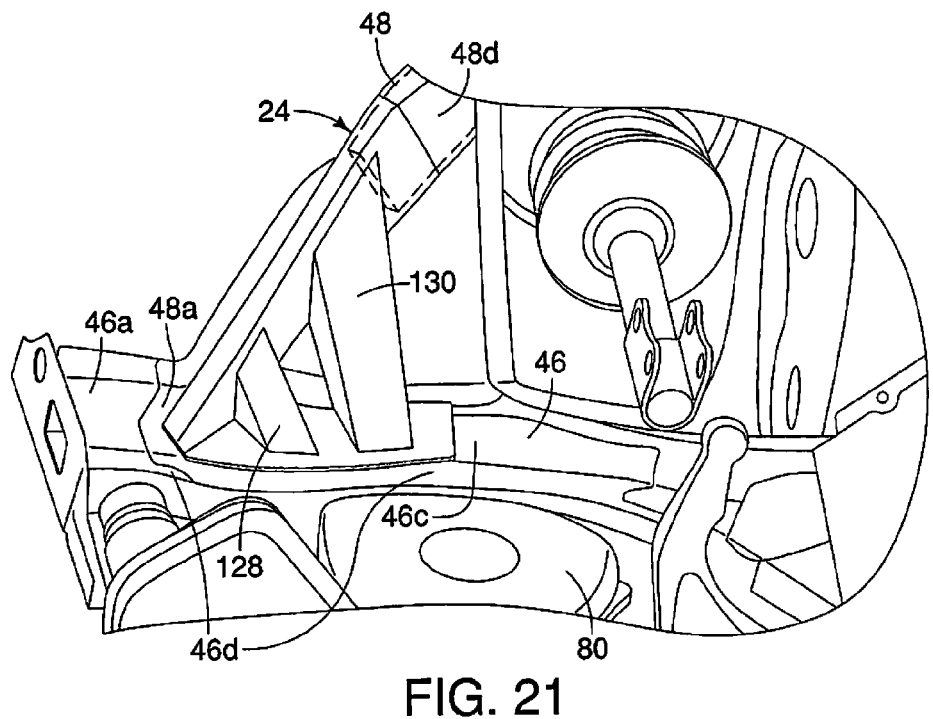
FIG. 21 is a perspective view of the front end of the vehicle looking upward and showing a front side member and a hood ledge of the vehicle body structure with the hood ledge reinforcement extending between the front side member and the hood ledge, in accordance with the first embodiment.
Figure 46:
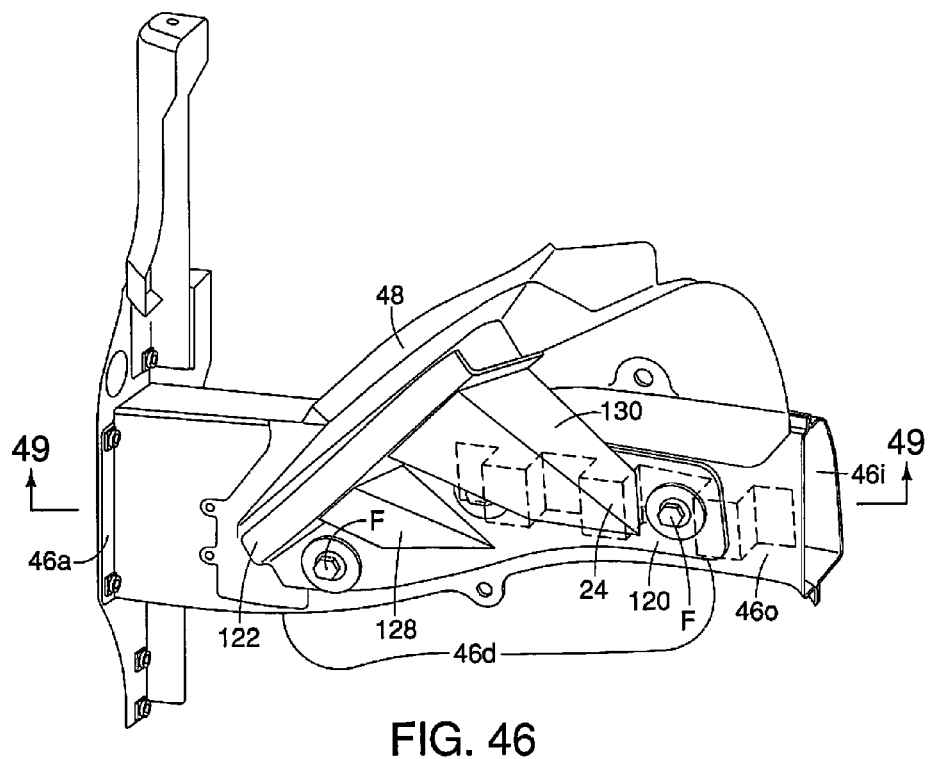
FIG. 46 is a perspective view of a portion of a front end structure showing the front side member with an inboard panel and an outboard panel, the hood ledge reinforcement and the hood ledge in accordance with a tenth embodiment.

The front side member 46 is a beam that extends forward to a front area of the vehicle 10 from the dash wall 44. Typically, the bumper assembly 14 attaches to a front end 46a of the front side member 46, as indicated in FIGS. 10 and 11. A rear portion 46b of the front side member 46 extends along the dash wall 44 and is rigidly attached thereto, as shown in FIG. 12. Depending upon the overall design of the vehicle 10, the front side member 46 can extend further rearward under a floor (not shown) of the passenger compartment. The front side member 46 also includes an outboard facing surface 46c, as indicated in FIGS. 10, 12 and 14. The front side member 46 further includes a forward section 46d located rearward of the front end 46a and forward of the rear portion 46b, as indicated in FIGS. 12, 21 and 46.

Figure 8:
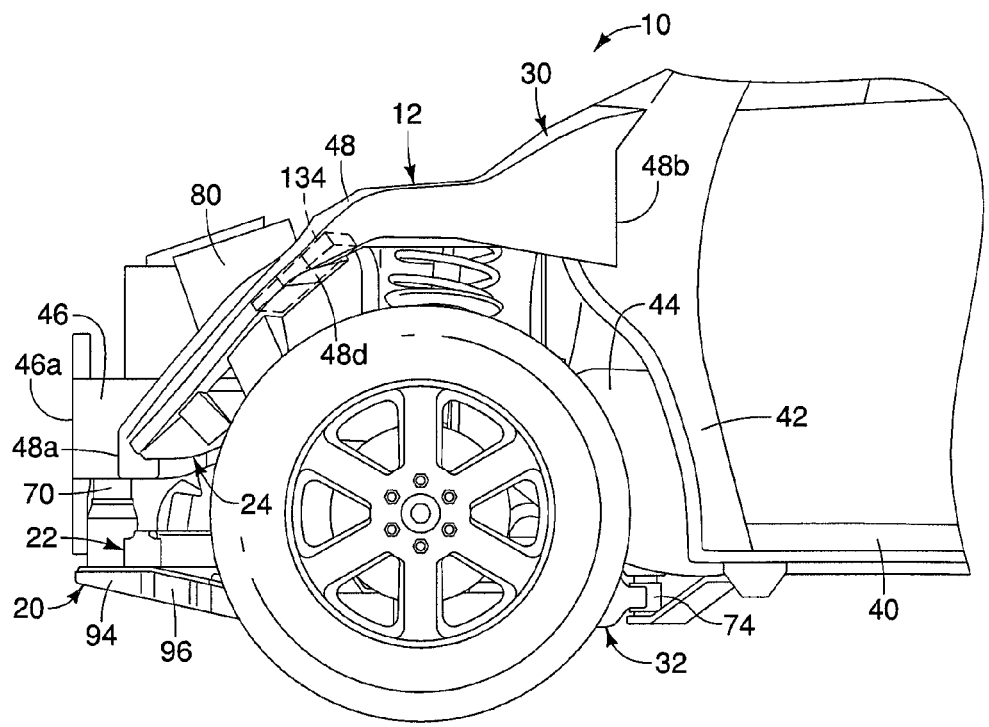
FIG. 8 is another side view of the front end of the vehicle with fenders removed showing a force receiving member, a lateral energy transfer member and a hood ledge reinforcement, in accordance with the first embodiment.
Figure 9:
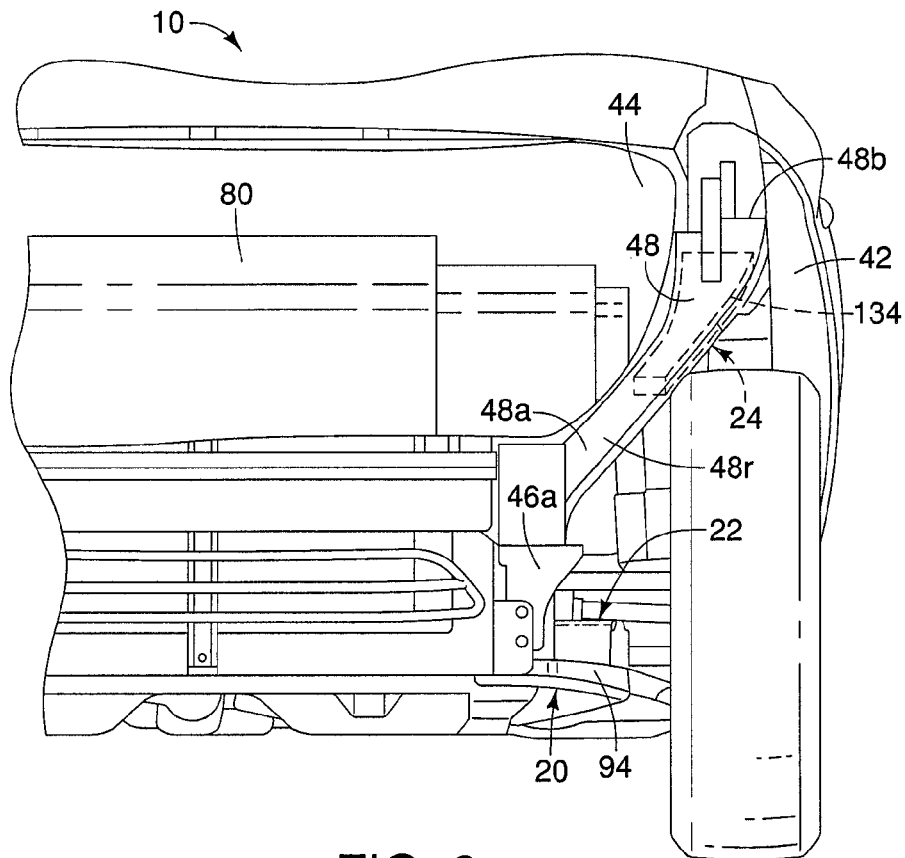
FIG. 9 is a front view of the front end of the vehicle with fenders removed showing the force receiving member, the lateral energy transfer member and a hood ledge that conceals the hood ledge reinforcement, in accordance with the first embodiment.

The hood ledge 48 is a structural member that has a front end 48a and a rear end 48b. The front end 48a of the hood ledge 48 is fixedly attached to the front end 46a of the front side member 46, as shown in FIGS. 8, 10 and 12-14. The rear end 48b of the hood ledge 48 is fixedly attached to at least one or both of the dash wall 44 and the A-pillar 42. The hood ledge 48 has an overall curved shape. Specifically, the hood ledge 48 extends upwardly and laterally outwardly away from the forward end 46a of the front side member 46 in a vehicle rearward direction, and then straightens out as it approaches the dash wall 44 and the A-pillar 42, as shown in FIGS. 9 and 11. As a result of this overall shape, the front end 48a of the hood ledge 48 is located inboard of the rear end 48b, as shown in FIGS. 9 and 11. The shape of the hood ledge 48 also defines a ramping surface 48r shown in FIGS. 9-12. The ramping surface 48r defines an inclined angle with respect to the vehicle longitudinal direction L, as indicated in FIG. 11. The ramping surface 48r is a lateral outwardly extending section of the hood ledge 48 that can transfer longitudinal force from an impact event and redirect at least a portion of that force into lateral movement of the vehicle 10, as described in greater detail below.

Although not shown, at least a portion of an upper surface 48c (see FIGS. 9 and 10) of the hood ledge 48 conforms to the shape and contour of an outboard edge of the engine hood 18. The hood ledge 48 also has a lower surface 48d, as shown in FIGS. 8 and 12. Since the sill 40, the A-pillar 42, the dash wall 44, the front side member 46 and the hood ledge 48 are conventional features, further description is omitted for the sake of brevity.

Figure 15:
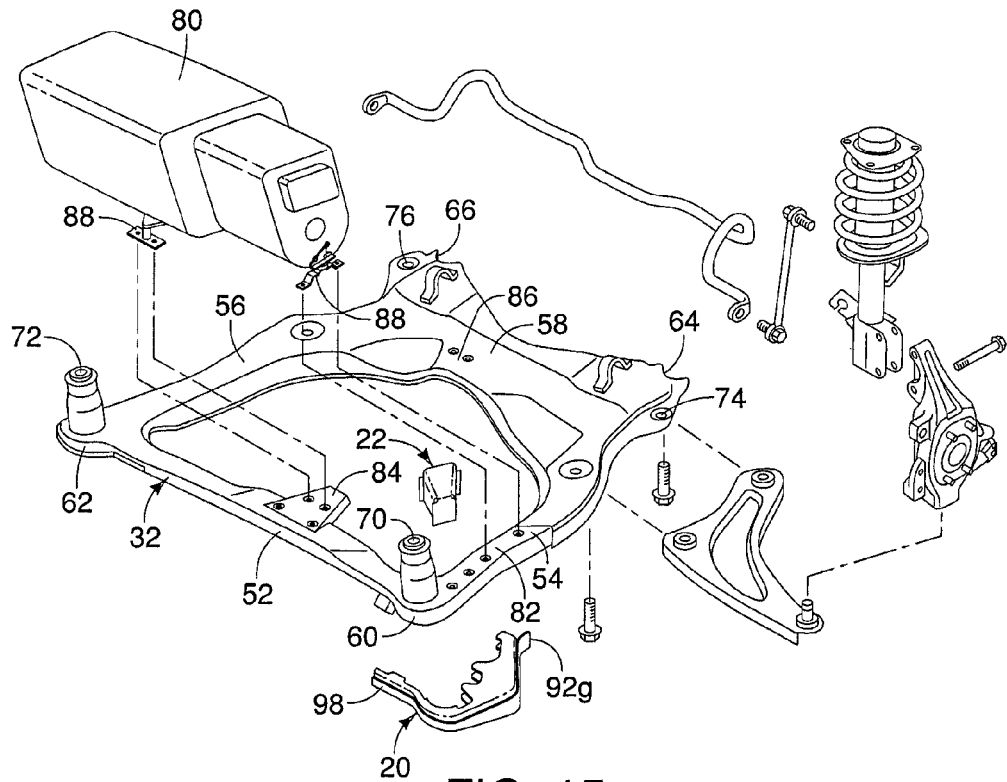
FIG. 15 is an exploded perspective view of an engine cradle removed from the front end of the vehicle, showing elements of the steering assembly, suspension assembly, engine assembly, the force receiving member and the lateral energy transfer member in accordance with the first embodiment.

A description of the engine cradle 32 of the front end structure 12 is now provided with specific reference to FIG. 15. The engine cradle 32 includes a front engine cradle member 52, a driver's side engine cradle member 54, a passenger's side engine cradle member 56 and a rear engine cradle member 58. The front engine cradle member 52 and the driver's side engine cradle member 54 are fixedly attached to one another such that the intersection between them defines a first front corner 60. The front engine cradle member 52 and the passenger's side engine cradle member 56 are fixedly attached to one another such that the intersection between them defines a second front corner 62. The driver's side engine cradle member 54 and the rear engine cradle member 58 are fixedly attached to one another. Rearward of an intersection between the driver's side engine cradle member 54 and the rear engine cradle member 58, a first rear corner 64 of the engine cradle is defined. The passenger's side engine cradle member 56 and the rear engine cradle member 58 are fixedly attached to one another. Rearward of an intersection between the passenger's side engine cradle member 56 and the rear engine cradle member 58, a second rear corner 66 of the engine cradle 32 is defined.

The engine cradle 32 mounts to an underside of the body structure 30 at four body attachment points 70, 72, 74 and 76. More specifically, the attachment point 70 is located at the first front corner 60, the attachment point 72 is located at the second front corner 62, the attachment point 74 is located at the first rear corner 64 and the attachment point 76 is located at the second rear corner 66. The attachment points 70, 72, 74 and 76 are connected to an underside of the body structure 30 in a conventional manner. Specifically, the attachment points 70 and 74 are attached to an underside of the front side member 46 on the driver's side of the vehicle 10, as indicated in FIG. 8, and the attachment points 72 and 76 are similarly attached to an underside of the front side member on the passenger's side (not shown) of the vehicle 10.

Although the engine cradle attachments to the body structure 30 are structurally strong, the attachment points 70, 72, 74 and 76 can include resilient bushings to absorb vibrations from an engine assembly 80 (described below) or alternatively can include rigid attachment structures, such as large fasteners such that the engine cradle 32 can be removably attached to the body structure 30.

The engine cradle 32 also includes three engine mounting structures 82, 84 and 86. The engine mounting structure 82 is located along an upper surface of the driver's side engine cradle member 54, rearward from the first front corner 60. The engine mounting structure 84 is located along an upper surface of the front engine cradle member 52. The engine mounting structure 86 is located along an upper surface of the rear engine cradle member 58. Each of the engine mounting structures 82, 84 and 86 includes a motor mount 88 (only two motor mounts are depicted in FIG. 15). The motor mounts 88 are fastened to the engine assembly 80 at spaced apart locations (only two of the motor mount locations are depicted in FIG. 15). The motor mounts 88 are further fastened to the engine cradle 32 at the locations 82, 84 and 86, as indicated in FIG. 15.

The engine assembly 80 includes an engine, a transmission and a transaxle. The engine can be an internal combustion engine or an electric motor. The transmission can be a continuously variable transmission (CVT), a dual clutch transmission (DCT), a manual transmission or an automatic transmission. Further the engine assembly 80 can be a combination of an internal combustion engine, an electric motor and a transmission that allows for switching between the two power sources (a hybrid power train). The engine assembly 80 is depicted generically as a series of boxes for the sake of simplicity and brevity. However, it should be understood that each individual engine and transmission has its own unique size and shape. Therefore, the invention is not limited to the generic shape given to the engine assembly 80 in the drawings.

The engine cradle 32 also can also support steering and suspension components, as indicated in FIG. 15. These steering and suspension components are basically supported by the rear engine cradle member 58 of the engine cradle 32. Description of these conventional steering and suspension components is omitted for the sake of brevity A description of the force receiving member 20 (the force receiving structure) is now provided with specific reference to FIGS. 16, 17 and 18. In the first embodiment, the force receiving member 20 is a two piece construct that includes an upper portion 90 and a lower portion 92. The upper portion 90 includes a plurality of flat flanges 90*a*, 90*b*, 90*c* and 90*d*, and a contoured flange 90*e* that extends from a forward end 90*f* of the upper portion 90 of the force receiving member 20 to a rearward end 90*g* of the upper portion 90.

The lower portion 92 includes a plurality of flat flanges 92*a*, 92*b*, 92*c* and 92*d*, and a contoured flange 92*e* that extends from a forward end 92*f* of the force receiving member 20 to a rearward end 92*g*. The rearward end 92*g* defines an attachment flange that is used for attachment to the driver's side engine cradle member 54 of the engine cradle 32.

Due to the inclusion of the attachment flange defined by the rearward end 92*g* of the lower portion 92, the lower portion 92 is slightly larger than the upper portion 90. More specifically, the contoured flange 92*e* is longer than the contoured flange 90*e*. Further, the contoured flange 90*e* of the upper portion 90 is shaped to nestle along and against an inboard surface 92*h* (shown in FIG. 18) of the lower portion 92. The upper portion 90 is welded to the lower portion 92 forming the overall shape of the force receiving member 20. The force receiving member 20 can also have an alternate, inverted configuration in which the contoured flange 90*e* can be longer than the contoured flange 92*e*, such that the contoured flange 92*e* is shaped to nestle along and against an inboard surface of the upper portion 90.

Figure 16:
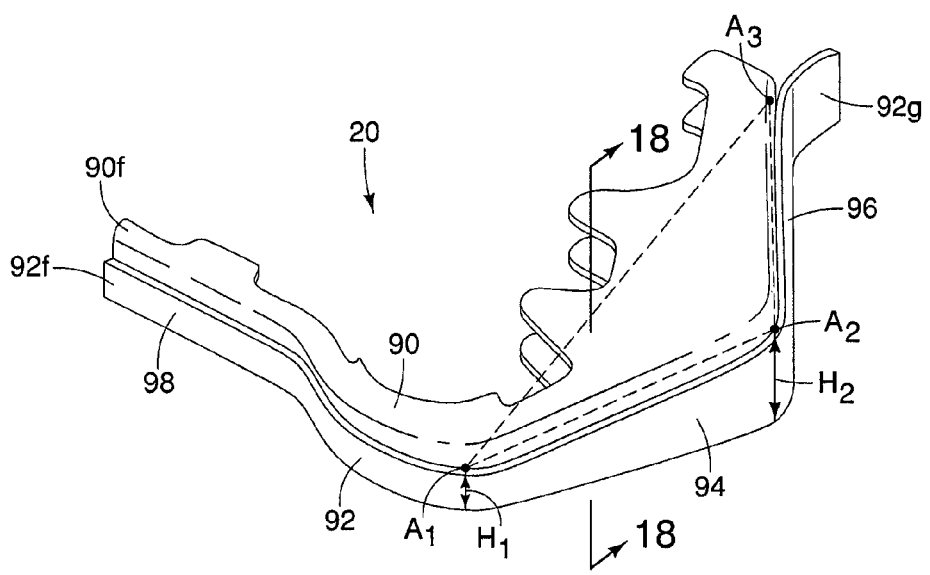
FIG. 16 is a perspective view of the force receiving member shown removed from the vehicle in accordance with the first embodiment.
Figure 17:
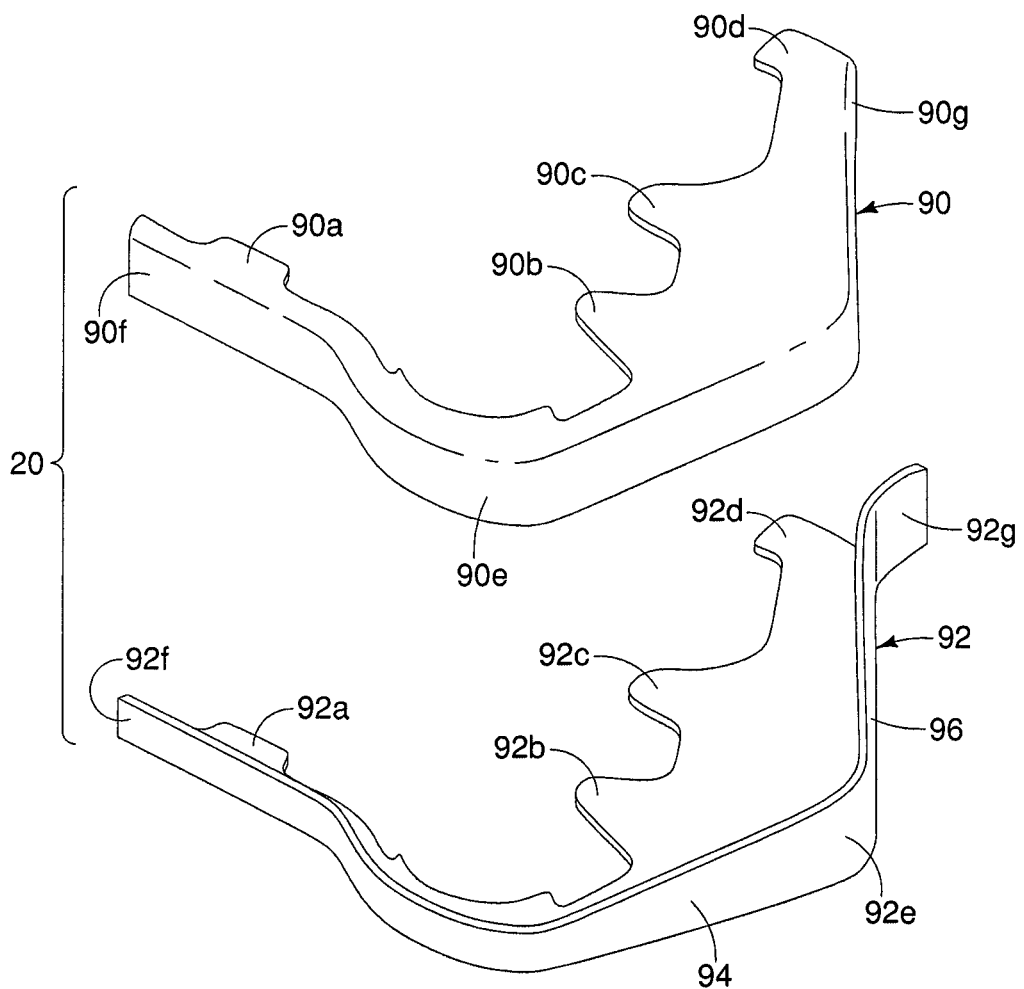
FIG. 17 is a perspective exploded view of the force receiving member depicted in FIG. 16, showing one possible way of assembling the force receiving member in accordance with the first embodiment.
Figure 18:
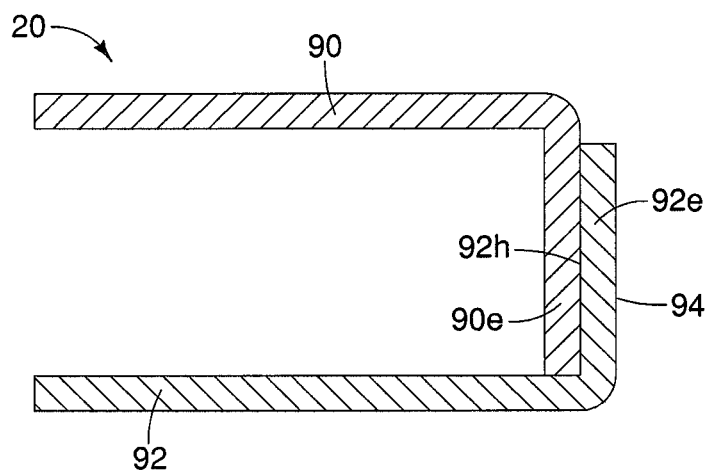
FIG. 18 is a cross-section of the force receiving member taken along the line 18-18 in FIG. 15 in accordance with the first embodiment.

With the upper section 90 welded to the lower section 92, the force receiving member 20 defines a force receiving surface 94 and a force transmitting section 96. The force receiving surface 94 is basically defined along a section of the contoured flange 92*e* of the lower portion 92 and is reinforced by the contoured flange 90*e* located rearward and welded to the countered flange 92*e*. The force transmitting section 96 is defined by portions of the contoured flange 90*e* and the contoured flange 92*e*, as indicated in FIGS. 16 and 17. The force receiving surface 94 is an outboard facing surface that is generally flat or planar. The force transmitting section 96 is also flat or planar, and is a rigid portion of the force receiving member 20 that is provided to transmit force received by the force receiving surface 92 to the engine cradle 32.

The force receiving member 20 is fixedly attached to the engine cradle 32 by, for example, welding. Specifically, each of the flat flanges 90*b*, 90*c* and 90*d* of the upper portion 90 can be welded to the upper surface of the driver's side cradle member 54 of the engine cradle 32. The flat flange 90*a* of the upper portion 90 can be welded to the upper surface of the front engine cradle member 52. Further, each of the flat flanges 92*b*, 92*c* and 92*d* of the lower portion 92 are welded to a lower surface (not shown) of the driver's side cradle member 54 of the engine cradle 32. The flat flange 92*a* of the lower portion 92 is welded to a lower surface (not shown) of the front engine cradle member 52. As well, the attachment flange defined by the rearward end 92*b* of the lower portion 92 of the force receiving member 20 is welded to an outboard surface of the driver's side cradle member 54 of the engine cradle 32 adjacent to the engine mounting structure 82. Alternatively, the force receiving member 20 can be attached by removable fasteners to the engine cradle 32.

Thus, the force receiving member 20 defines a force receiving structure that is rigidly and fixedly attached to the engine cradle 32. The overall shape of the force receiving member 20 is such that the force receiving member 20 basically wraps around the first front corner 60 of the engine cradle 32. It should be understood that the welding points described above for attachment of the force receiving member 20 to the engine cradle 32 are merely examples of the attachment between the two structures. Additional welding points may be included, as necessary, and differing attachment locations can alternatively be defined between the force receiving member 20 and the engine cradle 32.

It should be understood from the drawings and the description herein that there can be two force receiving members 20, one on each lateral side of the engine cradle 32, one at the first front corner 60 and one at the second front corner 62. However, since the two force receiving members 20 are identical (but mirror images of one another) description of the second of the two force receiving members 20 is omitted for the sake of brevity. Also, it is contemplated that there can be only one force receiving member at either the first front corner 60 or the second front corner 62 of the engine cradle 32.

It should be understood from the drawings and the description herein that the force receiving member 20 can alternatively be formed as a one-piece unitary member, or can be made of more than two metal elements welded together to provide the force redirecting features of the force receiving member 20. Alternatively, the engine cradle 32 can be designed and assembled to include the features of the force receiving member 20. In particular, the engine cradle 32 can be designed and manufactured to include the force receiving surface 94 and the force transmitting section 96 without the force receiving member 20. In other words, the front engine cradle member 52 and the driver's side engine cradle member 54 can be constructed differently to include the shapes, the structural functions and geometry of the force receiving surface 94 and the force transmitting section 96.

The force receiving member 20 basically defines a force receiving structure having the force receiving surface 94 and the force directing section 96. As indicated in FIG. 16, the design and orientation of the force receiving surface 94 and the force directing section 96 are such that a first apex $A_1$, a second apex $A_2$ and a third apex $A_3$ are defined by features of the force receiving member 20. Specifically, a forward end of the force receiving surface 94 defines the apex $A_1$ of the force receiving member 20. As shown in the drawings, the force receiving surface 94 extends laterally outboard from proximate the front corner 60 of the engine cradle 32 toward the force directing section 96. The second apex $A_2$ is located rearward of the force receiving surface 94 at the intersection of the force receiving surface 94 and the force directing section 96. In other words, the force receiving surface 94 extends from the first apex $A_1$ located adjacent to the front corner 60 of the engine cradle 32 to the second apex $A_2$. The force directing section 96 extends from the second apex $A_2$ to the third apex $A_3$. The third apex $A_3$ is located adjacent to the engine mounting structure 82 at a rearward end of the force receiving member 20, but forward of the rearward end 92*g* (the attachment flange) of the force receiving member 20. As is made clearer in the description of the various embodiments below (for example, FIGS. 31-34), the line extending between the first apex A1 and the third apex A3 is not parallel to a vehicle longitudinal direction L shown in FIG. 11 (also see FIG. 24-26), but extends substantially parallel to the longitudinal direction of the driver's side engine cradle member 54.

As indicated in FIG. 16, a portion of the force receiving member 20 extends inboard from the first apex $A_1$ around and in front of the first front corner 60 defining a front attachment arm 98. The front attachment arm 98 is fixedly attached to the engine cradle 32 such that the front attachment arm 98 covers a forward facing surface of the engine cradle 32.

As is indicated in FIG. 16, the force receiving surface 94 has a first vertical height $H_1$ at the first apex $A_1$ and a second vertical height $H_2$ at the second apex $A_2$. The second vertical height $H_2$ is greater than the first vertical height $H_1$.

As indicated in FIG. 11, the force receiving surface 94 extends rearwardly and laterally outbound at an inclined angle α with respect to the vehicle longitudinal direction L. The force receiving surface 94 is configured to receive an impacting force directed rearward in the vehicle longitudinal direction L in the small overlap test. At least a portion of the impacting force received by the force receiving surface 94 is then redirected to the engine cradle 32 proximate the engine mounting structure 82 via the force directing section 96. The force redirected by the force directing section 96 to the engine cradle 32 is a lateral force that causes the vehicle 10 to move laterally away from the points of impact with the barrier B. One effect of this redirecting of force into a lateral component of force is that the engine cradle 32 deforms such that the driver's side engine cradle member 54 of the engine cradle 32 can deform slightly causing contact between the engine cradle 32 and the engine assembly 80, and contact between the lateral energy transfer member 22 and the engine assembly 80, resulting in lateral movement of the vehicle 10, as described in greater detail below. Specifically, since a large portion of the mass of the vehicle 10 is constituted by the engine assembly 80, the application of lateral force on the engine assembly 80 ensures lateral movement of the vehicle 10.

The inclined angle α is 90 degrees or less, but is preferably 45 degrees of less and greater than 10 degrees. In the depicted embodiment, the inclined angle α is equal to 20 degrees (see FIG. 11). The inclined angle defined between the vehicle longitudinal direction L and the ramping surface 48r of the hood ledge 48 is similar or approximately equal to the inclined angle α.

A description of the lateral energy transfer member 22 is now provided with initial reference to FIGS. 12-15, 19 and 20. The lateral energy transfer member 22 is a rigid construct that is fixedly and rigidly mounted to an upper surface of the driver's side engine cradle member 54 of the engine cradle 32 and an upper surface of the force receiving member 20, as shown in FIGS. 12-14 and 26-28. It is also contemplated that the lateral energy transfer member 22 may be flexibly mounted to either or both of the driver's side cradle member 54 and the force receiving member 20, via flexible adhesive, rubber, or the like and/or movably mounted via a spring for example.

Figure 19:
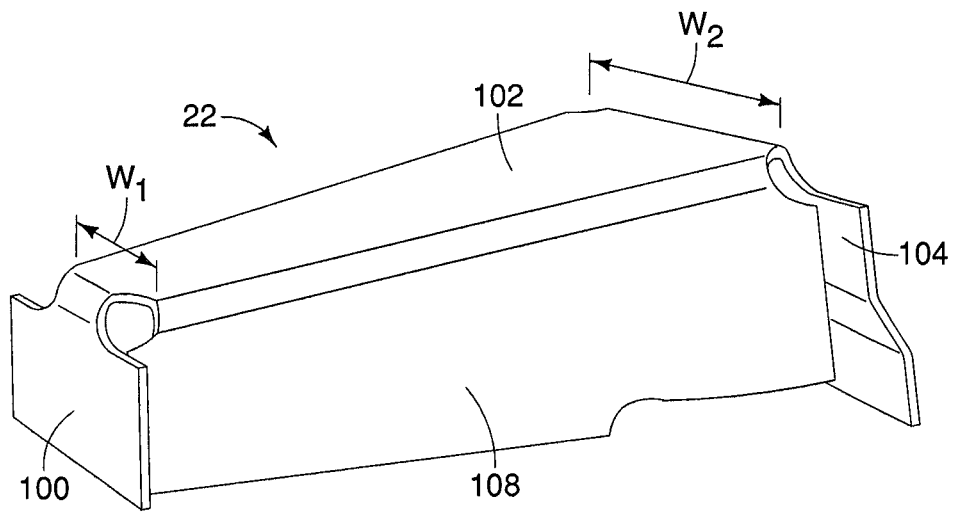
FIG. 19 is a perspective view of the lateral energy transfer member shown removed from the engine cradle in accordance with the first embodiment.
Figure 20:
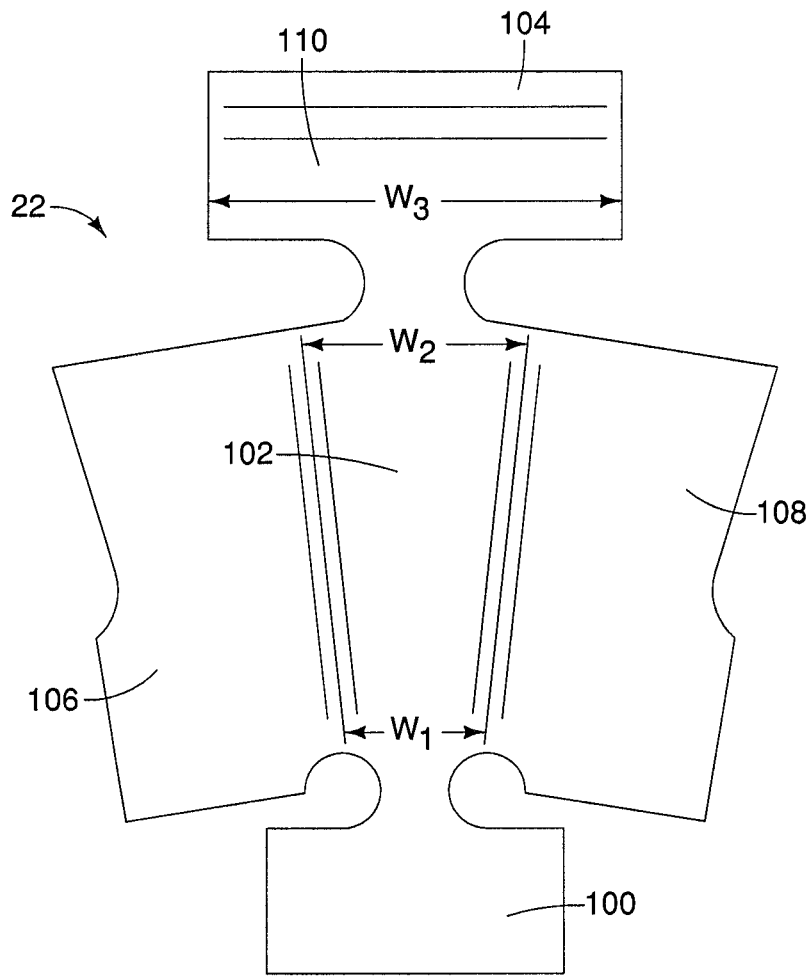
FIG. 20 is a top view of a sheet metal material cut but not yet bent into shape in order to manufacture the lateral energy transfer member in accordance with the first embodiment.

As shown in FIGS. 19 and 20, the lateral energy transfer member 22 basically includes an outboard side section 100, a top section 102, an inboard side section 104, a front side section 106 (shown in FIG. 20 only) and a rear side section 108. As indicated in FIG. 20, the lateral energy transfer member 22 can be formed from a single piece of sheet metal or metal plate that is cut approximately into the shape depicted in FIG. 20. The sheet metal or metal plate is then bent producing a plurality of deformed regions that subsequently define edges of the lateral transfer member 22, such that the sheet metal plate defines the box-like structure shown in FIG. 19. Alternatively, the lateral energy transfer member 22 can be made from a plurality of cast or forged plate elements welded together to form the overall shape depicted in FIG. 19. As another alternative configuration, the lateral energy transfer member 22 can be formed to have a curvilinear profile as either a solid or hollow tube-like structure. In still another configuration, the lateral energy transfer member 22 can be formed to have a C-shape with only an inboard side section 104, a front side section 106, and a rear side section 108.

The inboard side section 104 defines an engine contact surface 110. The outboard side section 100, the top section 102, the inboard side section 104, the front side section 106 and the rear side section 108 when deformed and welded into the shape depicted in FIG. 19 define a main body of the lateral energy transfer member 22.

Figure 24:
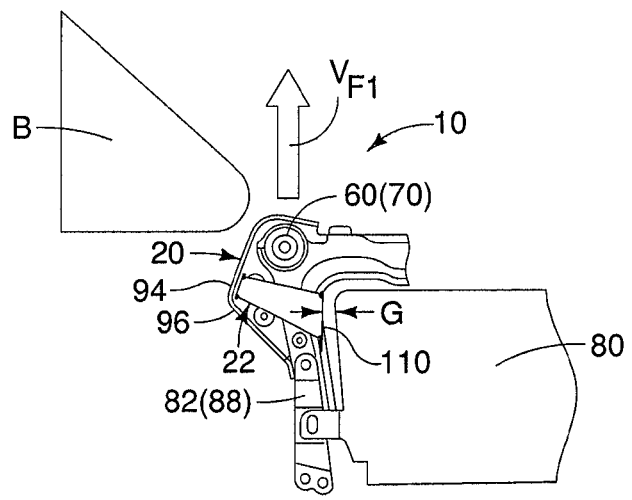
FIG. 24 is a top view of a portion of the engine cradle depicted in FIGS. 7-15 showing the engine assembly, the force receiving member and the lateral energy transfer member just prior to an impact event in a small overlap test with the engine cradle approaching the barrier in accordance with the first embodiment.
Figure 25:
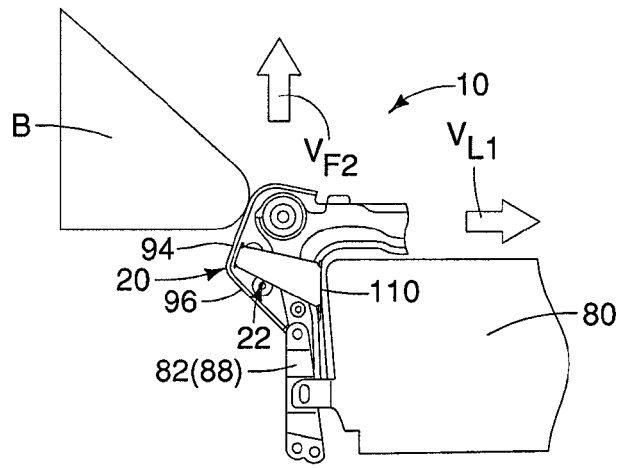
FIG. 25 is another top view similar to FIG. 24 showing the portion of the engine cradle, the engine assembly, the force receiving member and the lateral energy transfer member in a first stage of impact, just after initial impact, in the small overlap test, with the engine cradle (and the vehicle) beginning to move laterally away from the barrier in accordance with the first embodiment.
Figure 26:
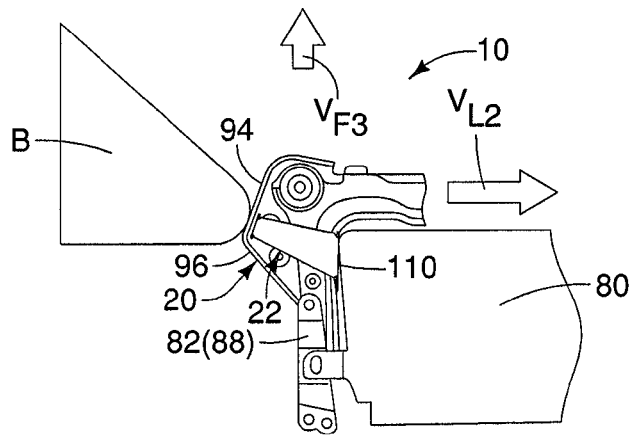
FIG. 26 is yet another top view similar to FIGS. 24 and 25 showing the portion of the engine cradle, the engine assembly, the force receiving member and the lateral energy transfer member in a second stage of impact in the small overlap test, with the engine cradle (and the vehicle) moved further laterally away from the barrier, the engine cradle experiencing deformation such that the lateral energy transfer member contacts the engine in accordance with the first embodiment.

As indicated in FIGS. 24-26, the engine contact surface 110 of the inboard side section 104 is positioned adjacent the engine assembly 80 and faces the engine assembly 80. The engine contact surface 110 is configured to contact the engine assembly 80 upon deformation of the engine cradle 32 to transfer the redirected lateral force from the force transmitting section 96 to the engine cradle 32, and the lateral energy transfer member 22 to the engine assembly 80. An engine assembly contact member (similar to an engine assembly contact member 150 later discussed in further detail in relation to the tenth embodiment), can be attached to either or both of the driver's side engine cradle member 54 and the engine contact surface 110 such that lateral forces can then be directed from the force receiving structure 20, the lateral energy transfer member 22, and the driver's side engine cradle member 54 to the engine assembly 80.

A first portion (an outboard portion) of the lateral energy transfer member 22 is welded to and extends along an upper surface of the force receiving structure 20. A second portion (an inboard portion) is welded to and extends along an upper surface of the engine cradle 32 such that the engine contact surface 110 is defined at an inboard end of the lateral energy transfer member 22. More specifically, the lateral energy transfer member 22 is fixedly attached to the driver's side engine cradle member 54 between the front corner 60 and the engine mounting structure 82 of the engine cradle 32. Alternatively, the engine cradle 32 can be designed and assembled to include the features of both of the force receiving structure 20 and the lateral energy transfer member 22, or otherwise the force receiving structure 20 and the lateral energy transfer member 22 can be integrally formed together and subsequently welded to the driver's side engine cradle member 54. The engine contact surface 110 is positioned adjacent the engine assembly 80 with a prescribed lateral gap G (FIG. 24) between the engine contact surface 110 and the engine assembly 80. The prescribed lateral gap G is a manufacturing tolerance sufficiently large such that the engine assembly 80 and the lateral energy transfer member 22 (as well as the engine cradle 32) do not contact one another during normal operation of the vehicle 10. The lateral gap G is also sufficiently small such that the lateral energy transfer member 22 is brought into contact with the engine assembly 80 in response to a lateral force being applied to the cradle member 32 upon deformation of either the engine cradle 32 and or surrounding structures that move the lateral energy transfer member 22 toward the engine assembly 80. In the depicted embodiments, the prescribed lateral gap G is at least ten millimeters.

In the depicted embodiment as indicated in FIGS. 19 and 20, the lateral energy transfer member 22 defines a first width $W_1$ measured between outboard ends of the front side section 106 and the rear side section 108. A second width $W_2$ measured between inboard ends of the front side section 106 and the rear side section 108 is greater than the first width $W_1$. Further, the inboard side section 104 defines a third width $W_3$ such that the engine contact surface extends rearward from the rear side section 108 toward the engine mounting structure 82 when installed to the engine cradle 32 and the force receiving member 20.

As indicated in FIG. 24, the lateral energy transfer member 22 extends longitudinally in a direction normal to the force receiving surface 94 of the force receiving member 20. In addition to directing lateral force to the engine assembly 80, the lateral energy transfer member 22 also provides reinforcement for the positioning of the force receiving member 20 relative to the engine cradle 32. Since the lateral energy transfer member 22 is fixed to the upper surface of the force receiving member 20 and the upper surface of the engine cradle 32, the lateral energy transfer member 22 also serves as a brace between the force receiving member 20 and the engine cradle 32, thereby preventing vertical movement of the force receiving member 20 relative to the engine cradle 32.

Figure 22:
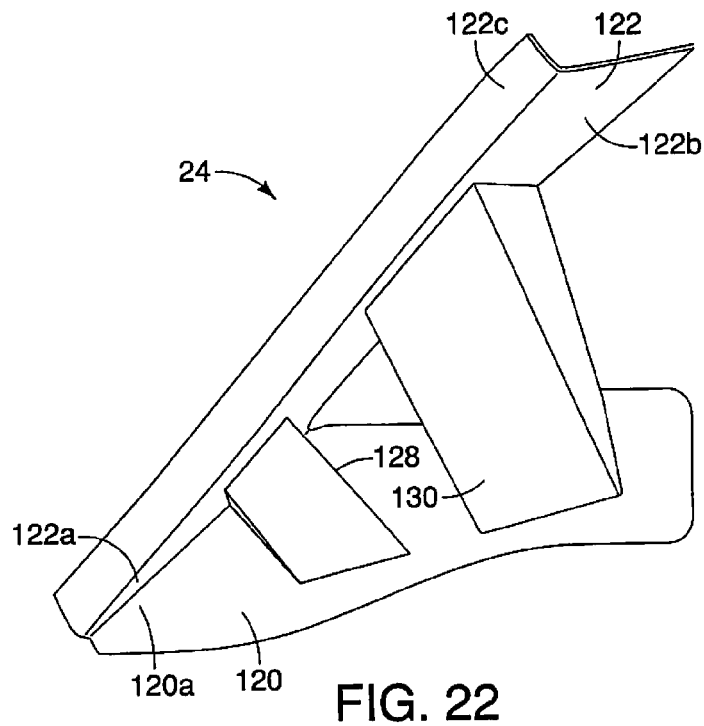
FIG. 22 is a side view of the hood ledge reinforcement shown removed from the front side member and the hood ledge, in accordance with the first embodiment.
Figure 23:
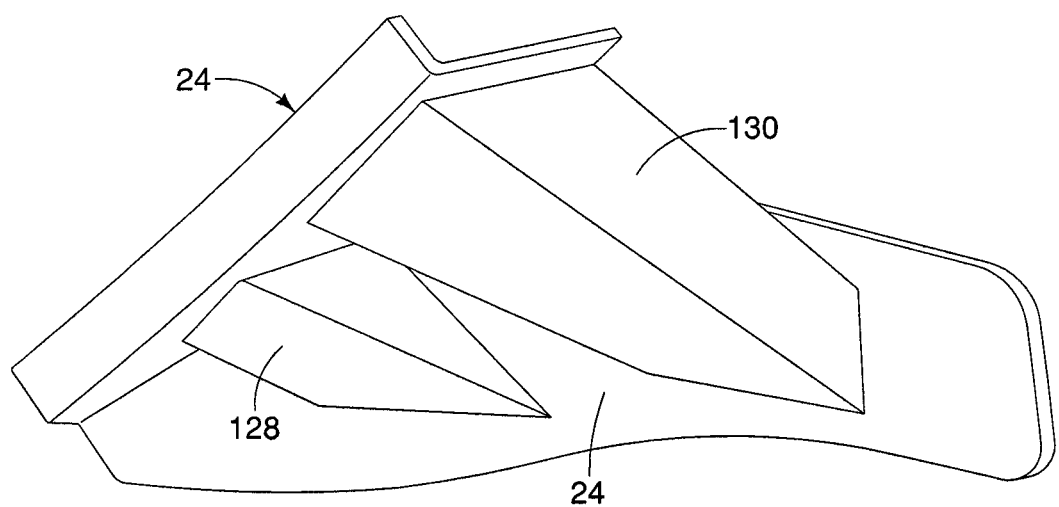
FIG. 23 is a perspective view of the hood ledge reinforcement, in accordance with the first embodiment.

A description is now provided for the hood ledge reinforcement 24 with specific reference to FIGS. 21-23. The hood ledge reinforcement 24 basically includes a lower section 120, an upper section 122 and a plurality of braces 128 and 130. The upper section 122 of the hood ledge reinforcement 24 includes a front end 122a that is fixedly attached to a front end 120a of the lower section 120 such that the lower section 120 and the upper section 122 define a V-shaped structure. More specifically, when viewed from the side, as shown in FIG. 22, the upper section 122 and lower section 120 define an acute angle therebetween. However, at the intersection of the front end 120a and the front end 122a, a downwardly facing surface of the upper section 122 and the outboard facing surface of the lower section 120 may define a right angle therebetween, or an obtuse angle, depending upon the overall design of the vehicle body 30.

The braces 128 and 130 extend between the lower section 120 and the upper section 122. More specifically, each of the braces 128 and 130 is fixedly attached to both the lower section 120 and the upper section 122 by, for example, welding.

The upper section 122 includes a main section 122b and a peripheral flange section 122c. The peripheral flange 122c extends in a direction that is angularly offset from the main section 122b. For example, in the depicted embodiment, at most points along the length of the flange 122c, the flange 122c is perpendicular to the main section 122b. When installed to the body structure 30, the main section 122b is welded at a variety of locations to the lower surface 48d of the hood ledge 48 and the flange 122c is welded to an outboard surface of the hood ledge 48. Further, when installed to the body structure 30, the lower section 120 is welded to the outboard surface 46c of the front side member 46.

In the depicted embodiment, the braces 128 and 130 are each basically made from a plurality of flat metal plates welded together to form a box-like structure and welded at lower and upper ends to the lower section 120 and the upper section 122. As shown in the drawings, the brace 128 is fixed in position between the lower section 120 and the upper section 122 along a seam or intersection between the lower section 120 and the upper section 122. However, the brace 130 is located proximate distal ends of each of the lower section 120 and the upper section 122. In the depicted embodiment, the braces 128 and 130 are not parallel to one another, but they can be arranged parallel to one another if desired.

As indicated in FIG. 12, an upper edge 120e of the lower section 120 of the hood ledge reinforcement 24 is horizontally oriented with the hood ledge reinforcement 24 installed to the front side member 46 and the hood ledge 48. Further, when installed, the lower section 120 of the hood ledge reinforcement 24 extends in the vehicle longitudinal direction.

The upper section 122 of the hood ledge reinforcement 24 extends upward and laterally away from the front end 46a of the front side member 46 with the hood ledge reinforcement 24 installed. Further, the upper section 122 extends along the ramping surface 48r providing strength and rigidity to the ramping surface 48r of the hood ledge 48.

In the depicted embodiment, the hood ledge reinforcement 24 is shown welded to the front side member 46 and the hood ledge 48. However, alternatively, the lower section 120 of the hood ledge reinforcement 24 can be removably fastened to the front side member 46 by, for example, threaded fasteners and the upper section 122 of the hood ledge reinforcement 24 can similarly be removably fastened to the underside of the hood ledge 48 by, for example, threaded fasteners.

As indicated in FIGS. 8 thru 12, the hood ledge 48 includes an internal reinforcement 134. The internal reinforcement 134 is concealed within the structure of the hood ledge 48 and is provided to stiffen the hood ledge 48 to more effectively redirect frontal impacting forces into lateral forces. The internal reinforcement 134 extends from a portion of the hood ledge 48 corresponding to the ramping surface 48r rearward toward the A-pillar 42.

FIGS. 24 thru 30 schematically show the plurality of force redirecting features and their reaction to the small overlap test. Specifically, FIGS. 24-26 represent the effects of the force receiving member 20 and the lateral energy transfer member 22 on the vehicle 10 during the test, and FIGS. 27-30 show the effects of the force receiving member 20 and the hood ledge reinforcement 24 on the vehicle 10 during the same test. It is difficult to show the effects of all three of the plurality of force redirecting features in a single series of images. Therefore, two different orientations are provided for a more complete understanding of the effects the plurality of force redirecting features have on the vehicle 10 as a result of the impact event during the test.

Specifically, each of the force receiving member 20, the lateral energy transfer member 22 and the hood ledge reinforcement 24 are configured such that during the impact event, they redirect at least a portion the forward momentum of the vehicle 10 into a lateral force component such that the vehicle 10 moves laterally relative to the barrier B with little or no rotation or angular displacement of the vehicle 10 relative to the forward movement of the vehicle 10.

FIG. 24 is a top view of a portion of the engine cradle 32 at the front corner 60. In FIG. 24, the force receiving member 20 and the lateral energy transfer member 22 are shown just prior to an impact event in the small overlap test. Just prior to impact, the vehicle 10 has forward momentum or forward velocity $V_{F1}$ such that the vehicle 10 is moving at a predetermined speed just prior to impact with the barrier B. In FIG. 25, the impact event is in a first stage with contact between the force receiving surface 94 and the barrier B. As a result of the impact event, a portion of the kinetic energy associated with the forward velocity $V_{F1}$ is translated or redirected into lateral velocity $V_{L1}$, which in turn results in the vehicle 10 beginning to move laterally away from the barrier B. Consequently the forward velocity $V_{F1}$ is reduced, as indicated by the smaller level of forward velocity $V_{F2}$. It should be understood that the force receiving member 20 and the engine cradle 32 begin to undergo some deformation in the schematic sequence depicted in FIGS. 25-26.

In FIG. 26 the impact event is well underway in a second stage of impact. The further contact between the force receiving surface 94 and the barrier B results in a continuing translation and/or redirecting of the forward velocity $V_{F2}$ into an increased level lateral velocity $V_{F2}$, which in turn results in further lateral movement of the vehicle 10 away from the barrier B. Consequently, the forward velocity $V_{F2}$ is further reduced, as indicated by the even smaller level of forward velocity $V_{F3}$.

As indicated in FIGS. 24-26, the force receiving member 20 receives the forward force directed rearward in the vehicle longitudinal direction L and redirects at least a portion of the force (kinetic energy) to the engine cradle 32 proximate the engine mounting structure 82 and motor mount 88 via the force directing section 96. Meanwhile, the lateral energy transfer member 22 provides reinforcement between the force receiving member 20 and the engine cradle 32. Further, as shown in FIG. 26, as the engine cradle 32 begins to undergo deformation as a result of the impact event, the engine contact surface 110 of the lateral energy transfer member 22 and the engine cradle 32 begin to press against adjacent surfaces of the engine assembly 80. The contact between the engine contact surface 110, the engine cradle 32 and the adjacent surfaces of the engine assembly 80 cause the engine assembly 80 to absorb some of the laterally directed force. Since the engine assembly 80 is attached to the engine cradle 32 via at least three different engine mounting structures 82, 84 and 86, and the engine assembly 80 has significant mass, the force applied to the engine assembly 80 pushes the vehicle 10 away from the barrier B.

In FIGS. 27-30, the lateral energy transfer member 22 is not visible, but the force receiving member 20 and the hood ledge reinforcement 24 are visible.

Figure 27:
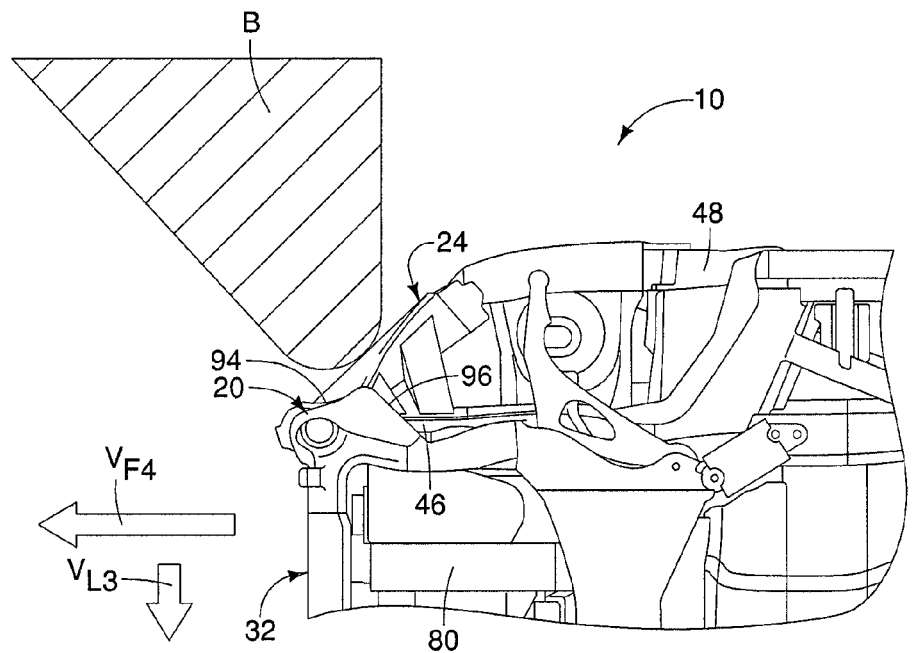
FIG. 27 is a bottom view of the vehicle depicted in FIGS. 7-14, showing the underside of the vehicle responding to an impact event in the small overlap test in a third stage of impact with the vehicle experiencing noticeable deformation and undergoing further lateral movement away from the barrier during impact with the force receiving member and the lateral energy transfer member in accordance with the first embodiment.

FIG. 27 is a bottom view of the vehicle 10 showing the underside of the vehicle 10 responding at a third stage of the impact event, where the force receiving member 20 has clearly experienced some deformation, although not shown, the lateral energy transfer member 22 has contacted the engine assembly 80, and the hood ledge 48 has begun making contact with the barrier B. A portion of the impact force applied from the barrier B to the hood ledge 48 is redirected by the hood ledge reinforcement 24 to the front side member 46 causing further lateral movement of the vehicle 10 away from the barrier B. Thus, at the third stage of the impact event, the hood ledge reinforcement 24 begins redirecting a forward velocity $V_{F4}$ to the front side member 46 to generate a lateral velocity $V_{F3}$ to move the vehicle 10 laterally away from the barrier B.

Figure 28:
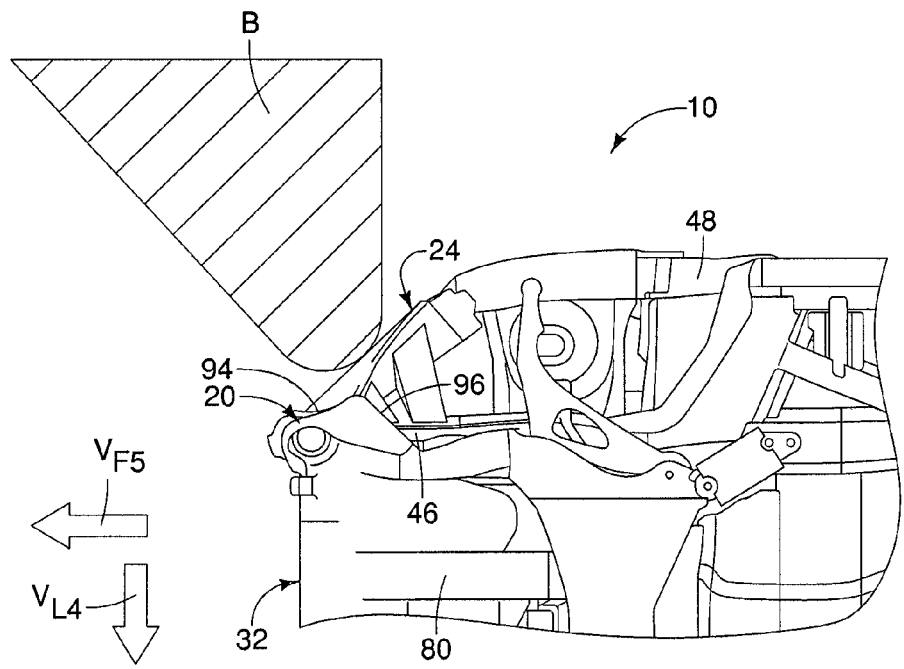
FIG. 28 is a second bottom view of the vehicle depicted in FIGS. 7-14, showing the underside of the vehicle responding in a fourth stage of impact, with the vehicle undergoing further deformation and undergoing continuing lateral movement away from the barrier during impact with the hood ledge and hood ledge reinforcement in accordance with the first embodiment.
Figure 29:
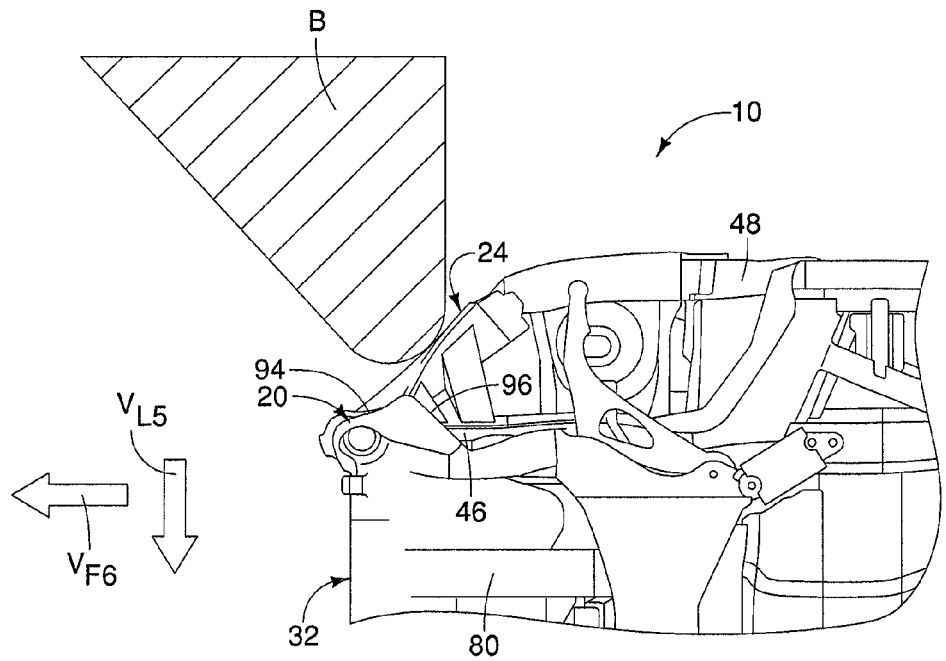
FIG. 29 is a third bottom view of the vehicle depicted in FIGS. 7-14, showing the underside of the vehicle responding in a fifth stage of impact, with the vehicle undergoing still further deformation and undergoing continuing lateral movement away from the barrier during impact with the hood ledge and hood ledge reinforcement in accordance with the first embodiment.
Figure 30:
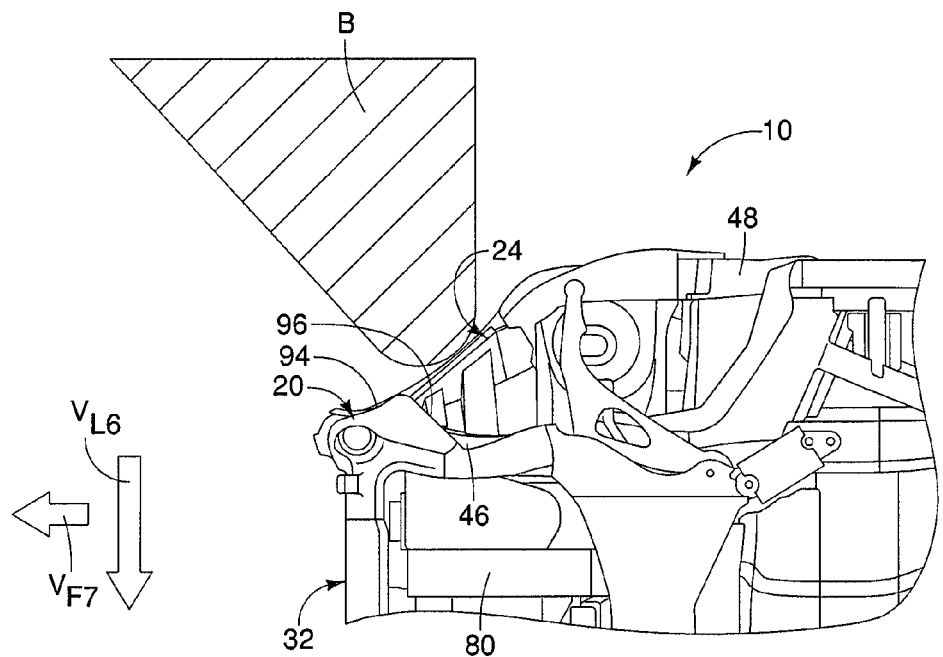
FIG. 30 is a fourth bottom view of the vehicle depicted in FIGS. 7-14, showing the underside of the vehicle responding in a sixth stage of impact, with the vehicle undergoing still further lateral movement away from the barrier during impact with the hood ledge and hood ledge reinforcement in accordance with the first embodiment.

In FIG. 28 in a fourth stage of the impact event, the hood ledge 48 has begun to experience some deformation with the hood ledge reinforcement 24 and redirects more of the forward velocity $V_{F4}$ to the front side member 46 and thereby generating lateral velocity $V_{F4}$, which further moves the vehicle 10 laterally away from the barrier B and correspondingly reducing the forward momentum as indicated to the reduced forward velocity $V_{F5}$ in FIG. 30. FIGS. 29 and 30 show fifth and sixth stages of the impact event with further increases in the lateral velocity $V_{F5}$ and $V_{L6}$ and further lateral movement of the vehicle 10 away from the barrier B as a result of further portions of the velocity $V_{F6}$ and $V_{F7}$ being redirected by the hood ledge reinforcement 24 to the front side member 46.

Thus, each of the plurality of force redirecting features, the force receiving member 20, the lateral energy transfer member 22 and the hood ledge reinforcement 24, receive impacting force associated with the above described impact event, and each redirects the received force redirecting a portion of the kinetic energy associated with the velocity of the vehicle 10 into a lateral force component such that the vehicle 10 moves laterally away from the barrier B. Further, the force receiving surface 94 of the force receiving member 20 and the ramping surface 48r of the hood ledge reinforcement 24 act in parallel with one another as ramps that redirect impact forces into lateral movement of the vehicle, with the lateral energy transfer member 22 assisting by transferring some of the redirected lateral kinetic energy to the engine assembly 80. Thus, the mass of the engine assembly 80 absorbs some of the redirected lateral kinetic energy and translates that lateral kinetic energy into lateral movement of the vehicle 10.

As is described in greater detail below, the force receiving member 20 can be employed in the vehicle 10 without the lateral energy transfer member 22 and without the hood ledge reinforcement 24, and still provide lateral movement of the vehicle 10 in response to the impact event. Similarly, the lateral energy transfer member 22 can be employed in the vehicle 10 without the force receiving member 20 and without the hood ledge reinforcement 24, and still provide lateral movement of the vehicle 10 in response to the impact event. Still further, the hood ledge reinforcement 24 can be employed in the vehicle 10 without the force receiving member 20 and without the lateral energy transfer member 22, and still provide lateral movement of the vehicle 10 in response to the impact event. As well, any combination of two of the three force redirecting features can be employed in the vehicle 10 without the third feature.

Descriptions of various alternate embodiments, including the ones mentioned in the previous paragraph, are described below. Additionally, it should be understood that any of the features described in relation to the various alternative embodiments below can be incorporated in combination with any of the features of the first embodiment where applicable.

Second Embodiment

Figure 31:
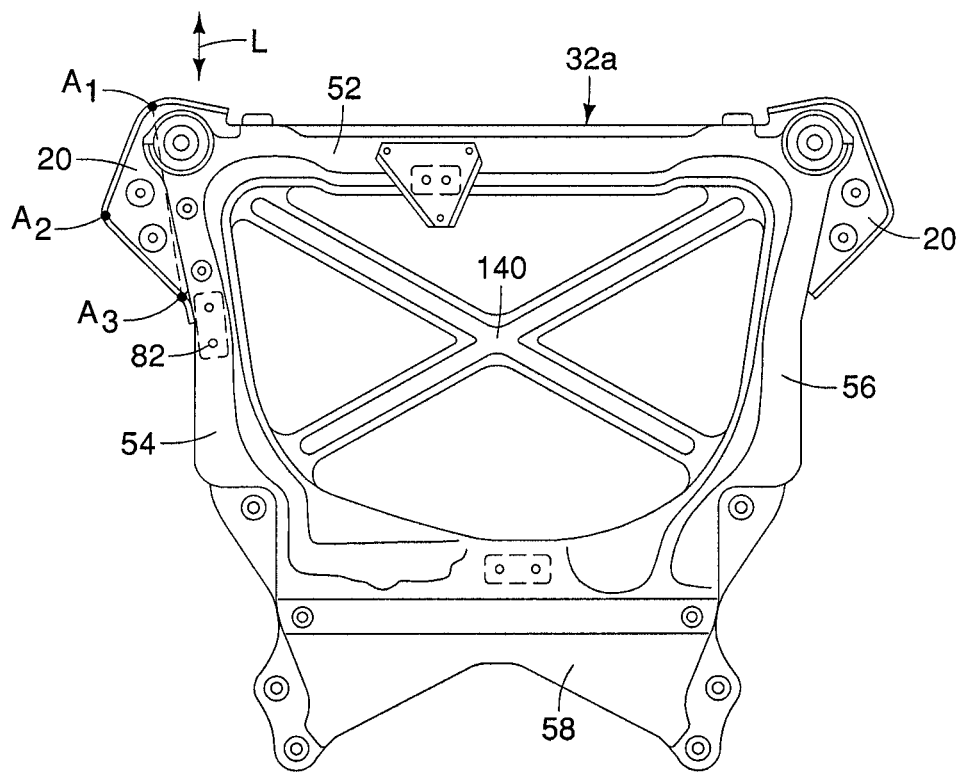
FIG. 31 is a top view of an engine cradle and a force receiving member showing the engine cradle with a X-shaped laterally extending cross-bracing in accordance with a second embodiment.

Referring now to FIG. 31, an engine cradle 32a in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the engine cradle 32a has the same sections as the engine cradle 32 of the first embodiment, such as the front engine cradle member 52, the driver's side engine cradle member 54, the passenger's side engine cradle member 56 and the rear engine cradle member 58 and the respective features of each, as described above. However, the engine cradle 32a further includes a cross-brace 140. The cross-brace 140 is fixedly attached to the intersection of the front engine cradle member 52 and the driver's side engine cradle member 54. The cross-brace 140 is further fixedly attached to the intersection of the passenger's side engine cradle member 56 and the rear engine cradle member 58. As well, the cross-brace 140 is fixedly attached to the intersection of the driver's side engine cradle member 54 and the rear engine cradle member 58. Finally, the cross-brace 140 is fixedly attached to the intersection of the front engine cradle member 52 and the passenger's side engine cradle member 56. The cross-brace 140 can be fastened by removable fasteners and/or welded to the engine cradle 32a.

The engine cradle 32a also includes two of the force receiving members 20, one at each front corner and corresponding lateral sides of the engine cradle 32a. The force receiving member 20 is described above, therefore further description is omitted for the sake of brevity.

The cross-brace 140 serves to stiffen the engine cradle 32a during an impact event in order to maximize the redirection of the forward momentum of the vehicle 10 during an impact event into the lateral movement of the vehicle 10.

The engine cradle 32a is employed in the vehicle 10 in exactly the same way as described in the first embodiment. Although not shown, the engine cradle 32a can include the lateral energy transfer member 22 and the vehicle 10 can also include the hood ledge reinforcement 24, as described above.

Alternatively, the engine cradle 32a can employ only the force receiving member 20, with both the lateral energy transfer member 22 and the hood ledge reinforcement 24 being omitted and still achieve the redirection of forward momentum into lateral movement in response to an impact event.

Third Embodiment

Figure 32:
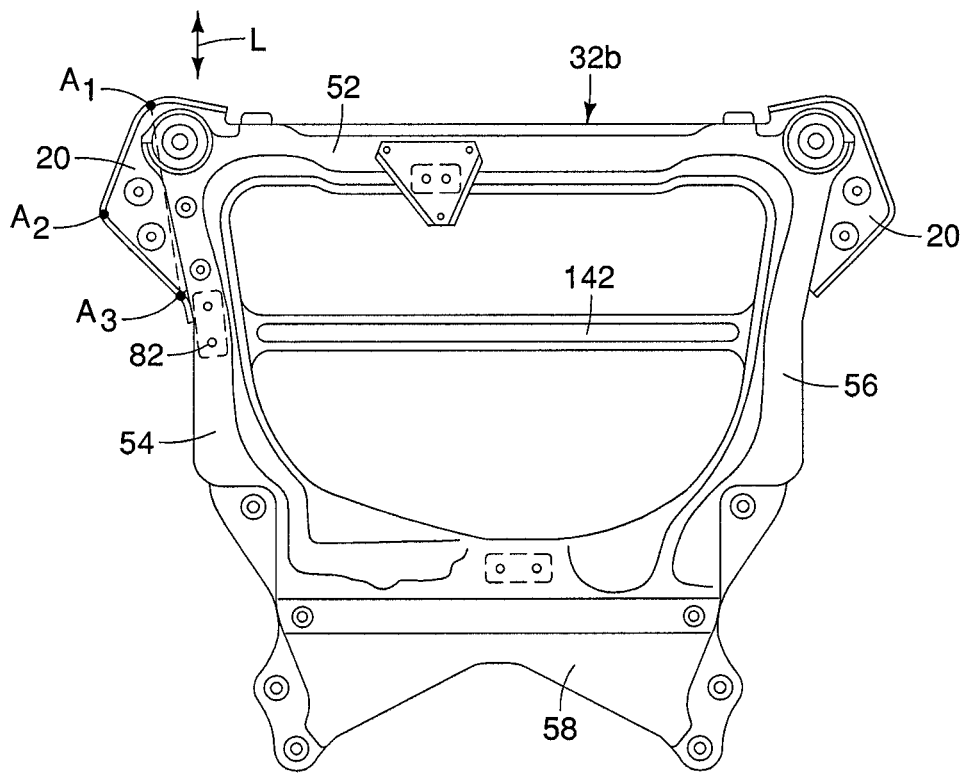
FIG. 32 is a top view of an engine cradle and a force receiving member showing the engine cradle with a laterally extending cross-bracing in accordance with a third embodiment.

Referring now to FIG. 32, an engine cradle 32b in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the engine cradle 32b has the same sections as the engine cradle 32 of the first embodiment, such as the front engine cradle member 52, the driver's side engine cradle member 54, the passenger's side engine cradle member 56 and the rear engine cradle member 58 and the respective features of each, as described above. However, the engine cradle 32b further includes a brace 142. A first end of the brace 142 is fixedly attached to a mid-section of an inboard side of the driver's side engine cradle member 54 adjacent to the engine mounting structure 82. A second end of the brace 142 is further fixedly attached to a mid-section of an inboard side of the passenger's side engine cradle member 56. The brace 142 can be fastened by removable fasteners and/or welded to the engine cradle 32b.

The engine cradle 32b also includes two of the force receiving members 20, one at each front corner and corresponding lateral sides of the engine cradle 32b. The force receiving member 20 is described above, therefore further description is omitted for the sake of brevity.

The brace 142 serves to stiffen the engine cradle 32b during an impact event in order to maximize the redirection of the forward momentum of the vehicle 10 during an impact event into the lateral movement of the vehicle 10.

The engine cradle 32b is employed in the vehicle 10 in exactly the same way as described in the first embodiment. Although not shown, the engine cradle 32b can include the lateral energy transfer member 22 and the vehicle 10 can also include the hood ledge reinforcement 24, as described above.

Alternatively, the engine cradle 32b can employ only the force receiving member 20, with both the lateral energy transfer member 22 and the hood ledge reinforcement 24 being omitted and still achieve the redirection of forward momentum into lateral movement in response to an impact event.

Fourth Embodiment

Figure 33:
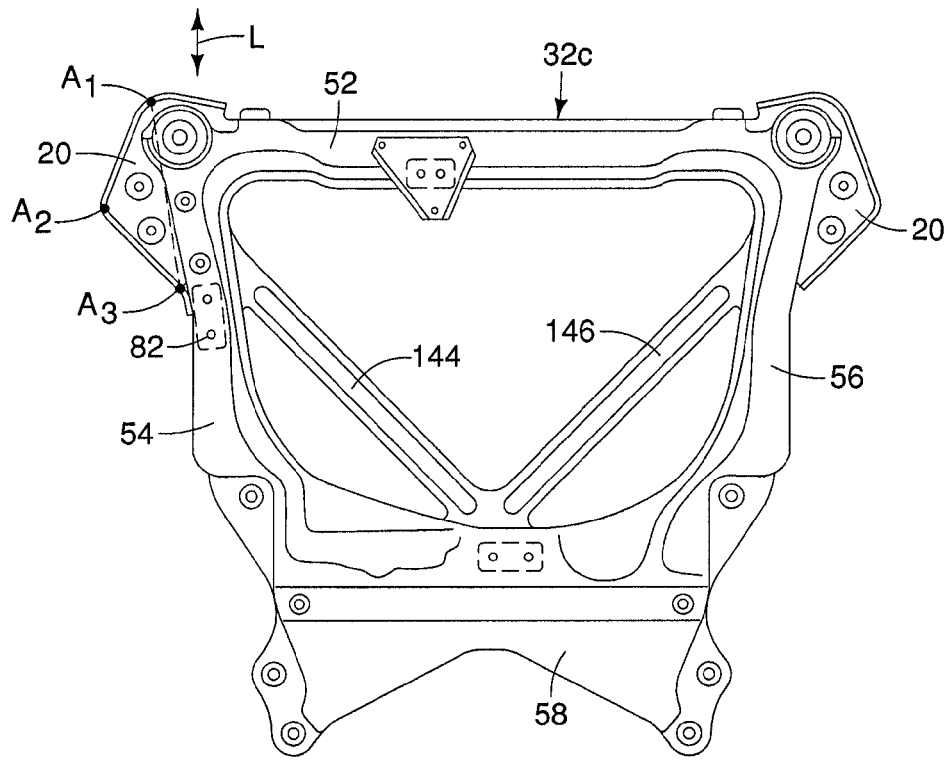
FIG. 33 is a top view of an engine cradle and a force receiving member showing the engine cradle with a V-shaped cross-bracing in accordance with a fourth embodiment.

Referring now to FIG. 33, an engine cradle 32c in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the engine cradle 32c has the same sections as the engine cradle 32 of the first embodiment, such as the front engine cradle member 52, the driver's side engine cradle member 54, the passenger's side engine cradle member 56 and the rear engine cradle member 58 and the respective features of each, as described above. However, the engine cradle 32b further includes braces 144 and 146.

A first end of the brace 144 is fixedly attached to a section of an inboard side of the driver's side engine cradle member 54 slightly forward from the engine mounting structure 82. A second end of the brace 144 is fixedly attached to a mid-section of a forward side of the rear engine cradle member 58 and a first end of the brace 146, which is also fixedly attached to the mid-section of a forward side of the rear engine cradle member 58. A second end of the brace 146 is further fixedly attached to a mid-section of an inboard side of the passenger's side engine cradle member 56. The braces 144 and 146 can be fastened by removable fasteners and/or welded to the engine cradle 32c.

The engine cradle 32c also includes two of the force receiving members 20, one at each front corner and corresponding lateral sides of the engine cradle 32c. The force receiving member 20 is described above, therefore further description is omitted for the sake of brevity.

The braces 144 and 146 serve to stiffen the engine cradle 32c during an impact event in order to maximize the redirection of the forward momentum of the vehicle 10 during an impact event into the lateral movement of the vehicle 10.

The engine cradle 32c is employed in the vehicle 10 in exactly the same way as described in the first embodiment. Although not shown, the engine cradle 32c can include the lateral energy transfer member 22 and the vehicle 10 can also include the hood ledge reinforcement 24, as described above.

Alternatively, the engine cradle 32c can employ only the force receiving member 20, with both the lateral energy transfer member 22 and the hood ledge reinforcement 24 being omitted and still achieve the redirection of forward momentum into lateral movement in response to an impact event.

Fifth Embodiment

Figure 34:
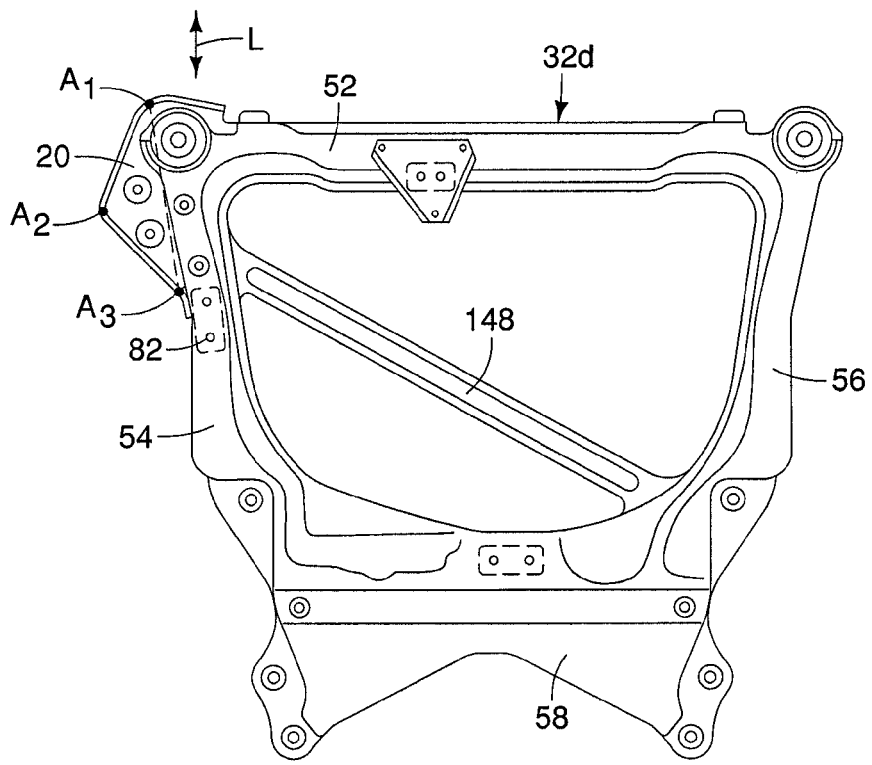
FIG. 34 is a top view of an engine cradle and a force receiving member showing the engine cradle with a cross-bracing that extends from a side portion to a rear portion of the engine cradle in accordance with a fifth embodiment.

Referring now to FIG. 34, an engine cradle 32d in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the engine cradle 32d has the same sections as the engine cradle 32 of the first embodiment, such as the front engine cradle member 52, the driver's side engine cradle member 54, the passenger's side engine cradle member 56 and the rear engine cradle member 58 and the respective features of each, as described above. However, the engine cradle 32d further includes a brace 148. A first end of the brace 148 is fixedly attached to a section of an inboard side of the driver's side engine cradle member 54 slightly forward of the engine mounting structure 82. A second end of the brace 148 is further fixedly attached to the intersection of the passenger's side engine cradle member 56 and the rear engine cradle member 58. The brace 148 can be fastened by removable fasteners and/or welded to the engine cradle 32b.

The engine cradle 32d also includes only one of the force receiving members 20, at one front corner of the engine cradle 32d. The force receiving member 20 is described above, therefore further description is omitted for the sake of brevity.

The brace 148 serves to stiffen the engine cradle 32d during an impact event in order to maximize the redirection of the forward momentum of the vehicle 10 during an impact event into the lateral movement of the vehicle 10.

The engine cradle 32d is employed in the vehicle 10 in exactly the same way as described in the first embodiment. Although not shown, the engine cradle 32d can include the lateral energy transfer member 22 and the vehicle 10 can also include the hood ledge reinforcement 24, as described above.

Alternatively, the engine cradle 32d can employ only the force receiving member 20, with both the lateral energy transfer member 22 and the hood ledge reinforcement 24 being omitted and still achieve the redirection of forward momentum into lateral movement in response to an impact event.

Sixth Embodiment

Figure 35:
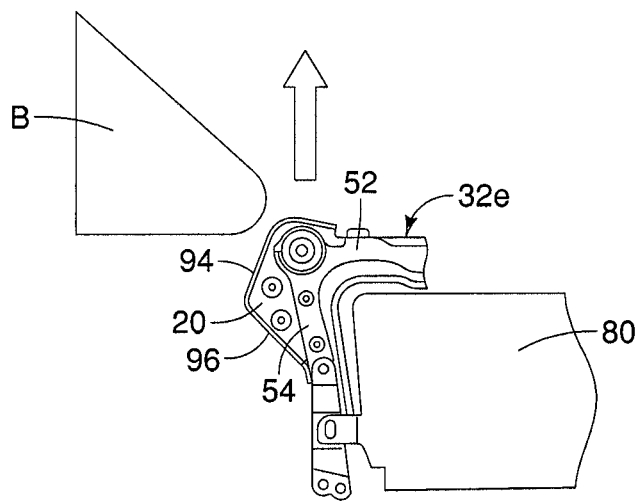
FIG. 35 is a top view of an engine cradle and a force receiving member shown just prior to an impact event in a small overlap test with the engine cradle approaching the barrier in accordance with a sixth embodiment.
Figure 36:
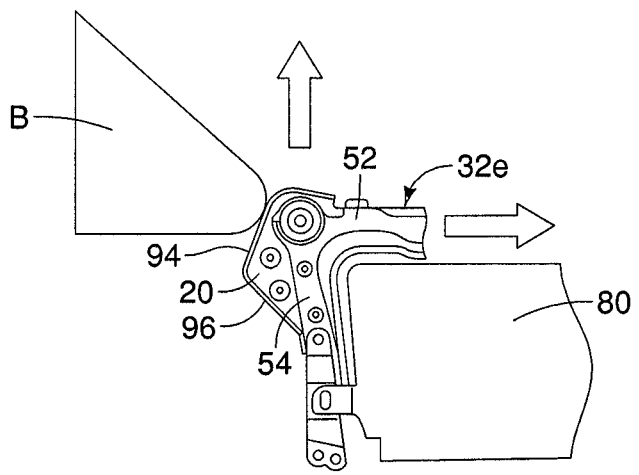
FIG. 36 is a second top view of the engine cradle and the force receiving member shown responding to the impact event in the small overlap test just after impact of the engine cradle with the barrier, with the engine cradle (and the vehicle) beginning to move laterally away from the barrier in accordance with the sixth embodiment.
Figure 37:
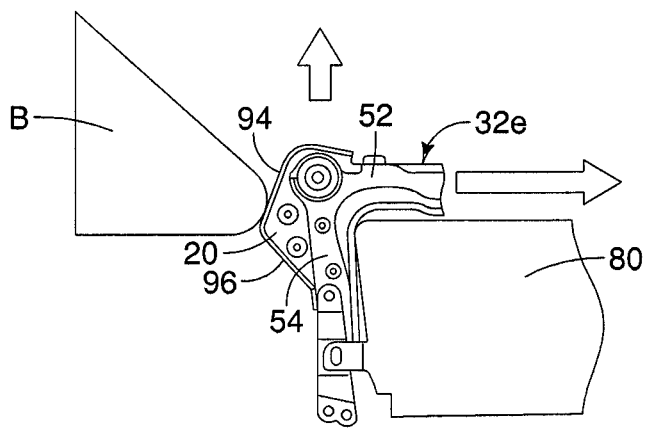
FIG. 37 is a third top view of the engine cradle and the force receiving member shown responding to the impact event in the small overlap test with the impact event progressing such that the engine cradle (and the vehicle) are moved further laterally away from the barrier in accordance with the sixth embodiment.

Referring now to FIGS. 35-37, an engine cradle 32e in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, the engine cradle 32e has the same sections as the engine cradle 32 of the first embodiment, such as the front engine cradle member 52, the driver's side engine cradle member 54, the passenger's side engine cradle member 56 (not shown in FIGS. 35-37) and the rear engine cradle member 58 (not shown in FIGS. 35-37) and the respective features of each, as described above.

In the sixth embodiment, the engine cradle 32e is provided with the force receiving member 20, as described above in the first embodiment. However, the engine cradle 32e does not include the lateral energy transfer member 22. Further, the vehicle 10 does not include the hood ledge reinforcement 24. However, the engine cradle 32e, when used in the vehicle 10, achieves a similar redirection of forward velocity into lateral velocity in response to an impact event as in the first embodiment.

Seventh Embodiment

Figure 38:
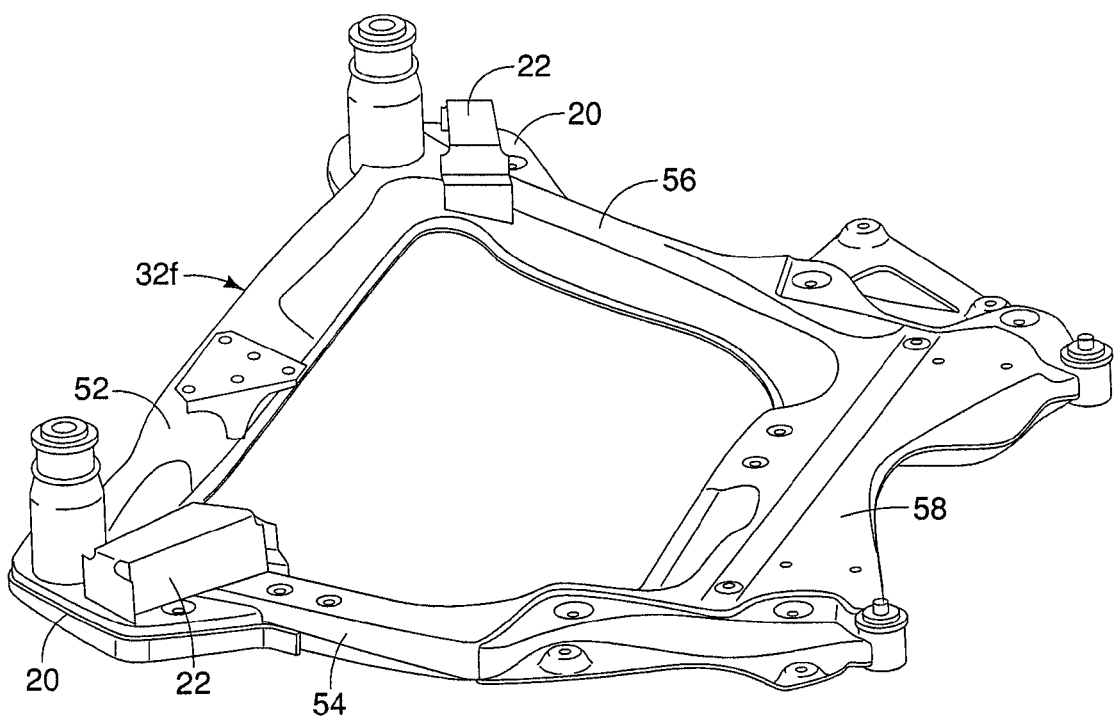
FIG. 38 is a perspective view of an engine cradle removed from the front end of the vehicle, showing the force receiving member and the lateral energy transfer member in accordance with a seventh embodiment.
Figure 39:
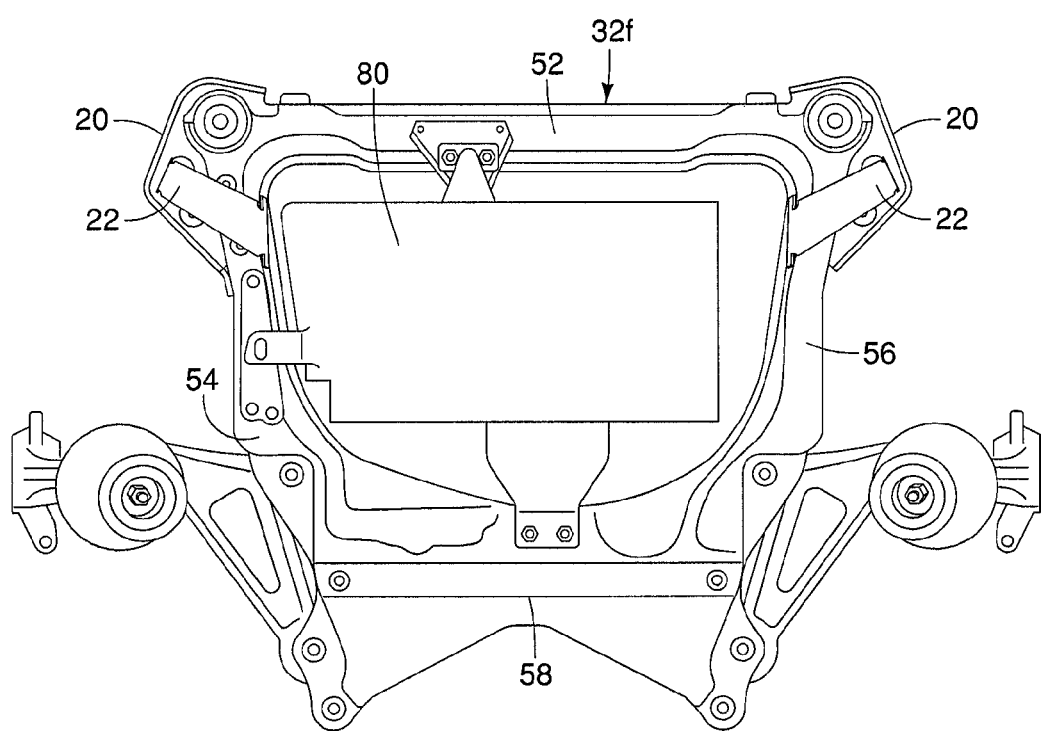
FIG. 39 is a top view of the engine cradle depicted in FIG. 38 showing elements of the steering assembly, the suspension assembly, the engine assembly, the force receiving member and the lateral energy transfer member in accordance with the seventh embodiment.

Referring now to FIGS. 38 and 39, an engine cradle 32f in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

In the seventh embodiment, the engine cradle 32f has the same sections as the engine cradle 32 of the first embodiment, such as the front engine cradle member 52, the driver's side engine cradle member 54, the passenger's side engine cradle member 56 and the rear engine cradle member 58 and the respective features of each, as described above.

In the seventh embodiment, the engine cradle 32f is provided with the force receiving member 20 and the lateral energy transfer member 22, as described above in the first embodiment. However, the vehicle 10 does not include the hood ledge reinforcement 24. However, the engine cradle 32f, when used in the vehicle 10, achieves a similar redirection of forward momentum into lateral movement in response to an impact event as in the first embodiment.

Eighth Embodiment

Figure 40:
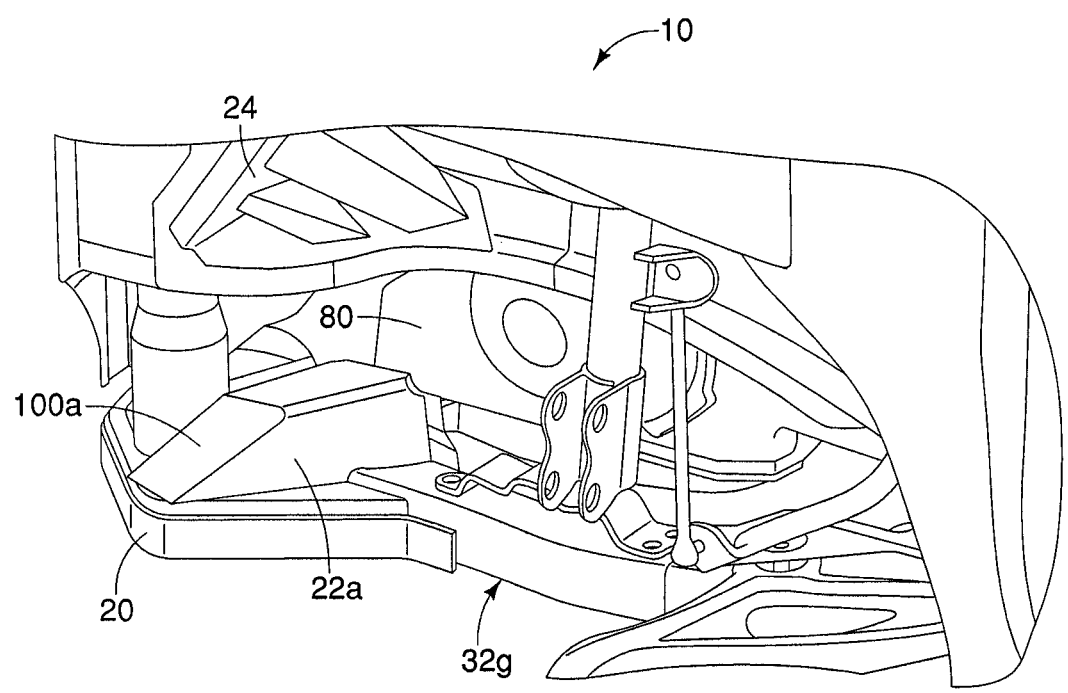
FIG. 40 is a perspective view of the front end of the vehicle, showing the engine cradle, the force receiving member and a lateral energy transfer member in accordance with a eighth embodiment.
Figure 41:
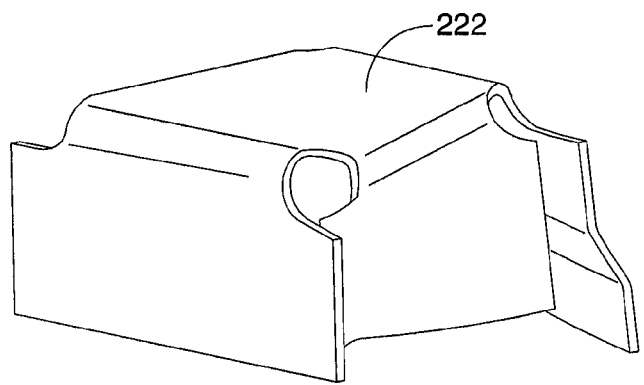
FIG. 41 is a perspective view of a lateral energy transfer member shown removed from the vehicle in accordance with an ninth embodiment.
Figure 42:
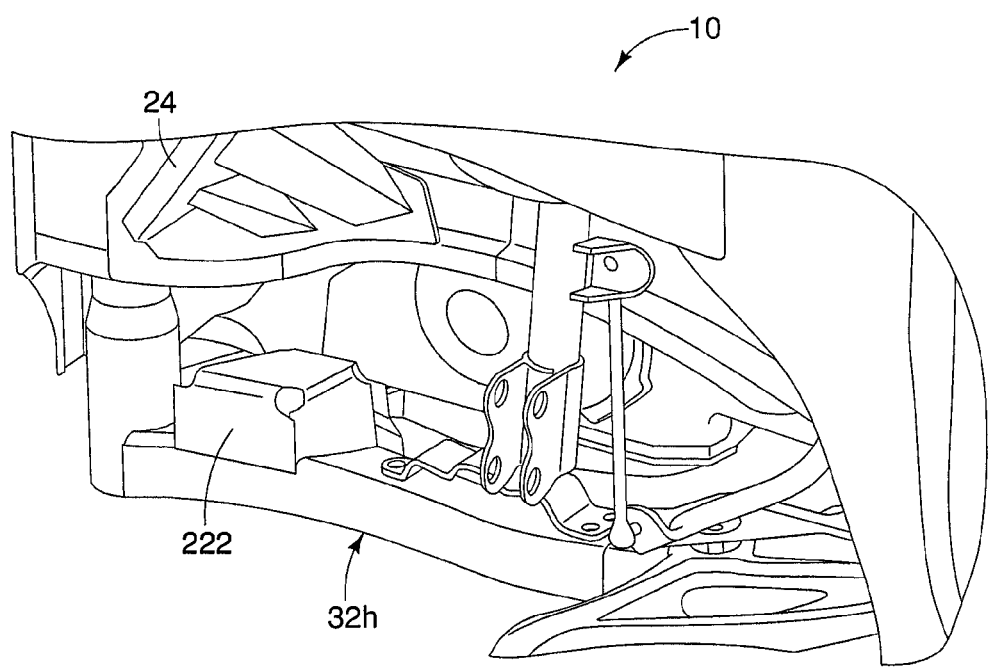
FIG. 42 is a perspective view of the front end of the vehicle, showing the engine cradle and the lateral energy transfer member in accordance with the ninth embodiment.

Referring now to FIG. 40, the vehicle 10 having an engine cradle 32g in accordance with an eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

In the eighth embodiment, the engine cradle 32g has the same sections as the engine cradle 32 of the first embodiment, such as the front engine cradle member 52, the driver's side engine cradle member 54, the passenger's side engine cradle member 56 and the rear engine cradle member 58 and the respective features of each, as described above.

In the eighth embodiment, the engine cradle 32g is provided with the force receiving member 20 and a lateral energy transfer member 22a that replaces the lateral energy transfer member 22 of the first embodiment. The lateral energy transfer member 22a is virtually identical to the lateral energy transfer member 22 of the first embodiment, except that the lateral energy transfer member 22a is provided with a sloping upper surface 100a that is angled downward toward the outboard side of the vehicle 10, such that the height of the lateral energy transfer member 22a decreases from the inboard side section 104 toward the outboard side section 100. Alternatively, the upper surface 100a could have a step-shape such that the height of the lateral energy transfer member decreases from the inboard side section 104 toward the outboard side section 100. However, the engine cradle 32g, achieves a similar redirection of forward momentum into lateral movement in response to an impact event as in the first embodiment.

Ninth Embodiment

Referring now to FIGS. 41-45, the vehicle 10 having an engine cradle 32h in accordance with a ninth embodiment will now be explained. In view of the similarity between the first and ninth embodiments, the parts of the ninth embodiment that are identical to the parts of the first embodiment will be given the same reference numerals as the parts of the first embodiment. Moreover, the descriptions of the parts of the ninth embodiment that are identical to the parts of the first embodiment may be omitted for the sake of brevity.

In the ninth embodiment, the engine cradle 32h has the same sections as the engine cradle 32 of the first embodiment, such as the front engine cradle member 52, the driver's side engine cradle member 54, the passenger's side engine cradle member 56 and the rear engine cradle member 58 and the respective features of each, as described above.

In the ninth embodiment, the force receiving member 20 is omitted, and a modified a lateral energy transfer member 222 replaces the lateral energy transfer member 22 of the first embodiment. The lateral energy transfer member 222 has all the features of the lateral energy transfer member 22 of the first embodiment, but is shortened due to the omitting of the force receiving member 20. Additionally, of the lateral energy transfer member 22 could have a sloped or step shaped upper surface 100a as discussed in relation to the eighth embodiment. Also, the lateral energy transfer member 222 can alternatively have a C-shape with only an inboard side section 104, a front side section 106, and a rear side section 108 as described above in relation to the first embodiment.

Figure 43:
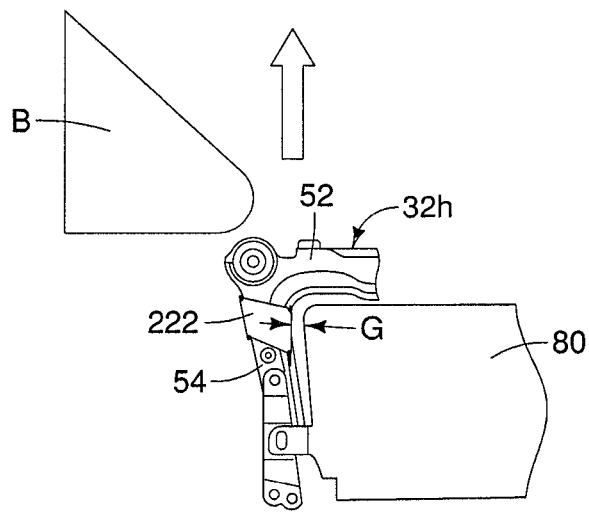
FIG. 43 is a top view of a portion of the engine cradle depicted in FIG. 42 showing the engine assembly and the lateral energy transfer member just prior to an impact event in a small overlap test with the engine cradle approaching the barrier in accordance with the ninth embodiment.
Figure 44:
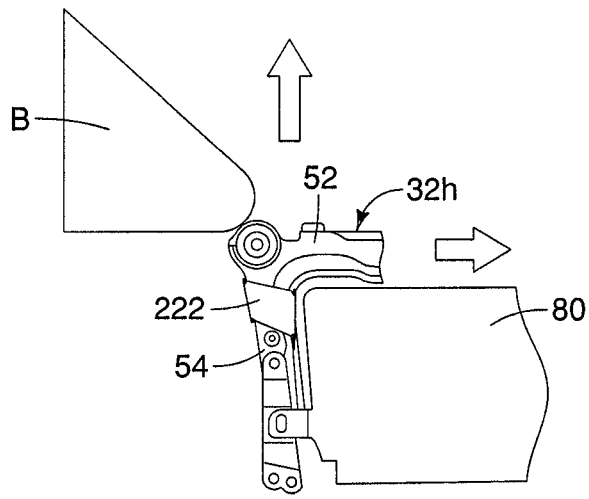
FIG. 44 is another top view of the portion of the engine cradle, the engine assembly and the lateral energy transfer member shown just after initial impact in the small overlap test, with the engine cradle beginning to deform moving the lateral energy transfer member laterally toward the engine assembly in accordance with the ninth embodiment.
Figure 45:
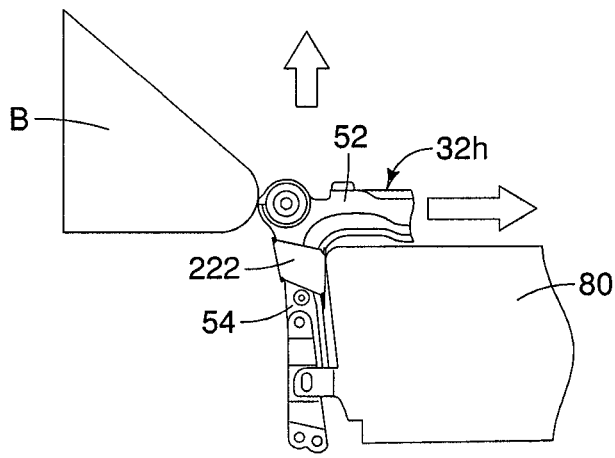
FIG. 45 is yet another top view of the portion of the engine cradle, the engine assembly and the lateral energy transfer member shown after further impact in the small overlap test, with the engine cradle undergoing further deformation such that the lateral energy transfer member contacts the engine assembly transmitting impact energy thereto in accordance with the ninth embodiment.

FIGS. 43-45 show three stages of the impact event with the engine cradle 32h beginning to deform in FIG. 46. Further deformation of the engine cradle 32h moves the lateral energy transfer member 222 into contact with the engine assembly 80 such that the engine assembly 80 absorbs some of the lateral energy causing the vehicle 10 to move laterally.

The engine cradle 32h, achieves a similar redirection of forward velocity into lateral velocity in response to an impact event as in the first embodiment.

Tenth Embodiment

Referring now to FIGS. 46-52, the vehicle 10 in accordance with a tenth embodiment will now be explained. In view of the similarity between the first and tenth embodiments, the parts of the tenth embodiment that are identical to the parts of the first embodiment will be given the same reference numerals as the parts of the first embodiment. Moreover, the descriptions of the parts of the tenth embodiment that are identical to the parts of the first embodiment may be omitted for the sake of brevity.

In the tenth embodiment, the force receiving member 20, and the lateral energy transfer member 22 have been omitted from the vehicle 10. However, the hood ledge reinforcement 24 is included as described above with respect to the first embodiment. In the tenth embodiment, the hood ledge reinforcement 24 includes the lower section 120 (see FIG. 49), the brace 128, the brace 130 and the upper section 122. The upper section 122 is fixedly attached to the hood ledge 48 and the lower section is fixedly attached to the front side member 46 by mechanical fasteners F.

Figure 47:
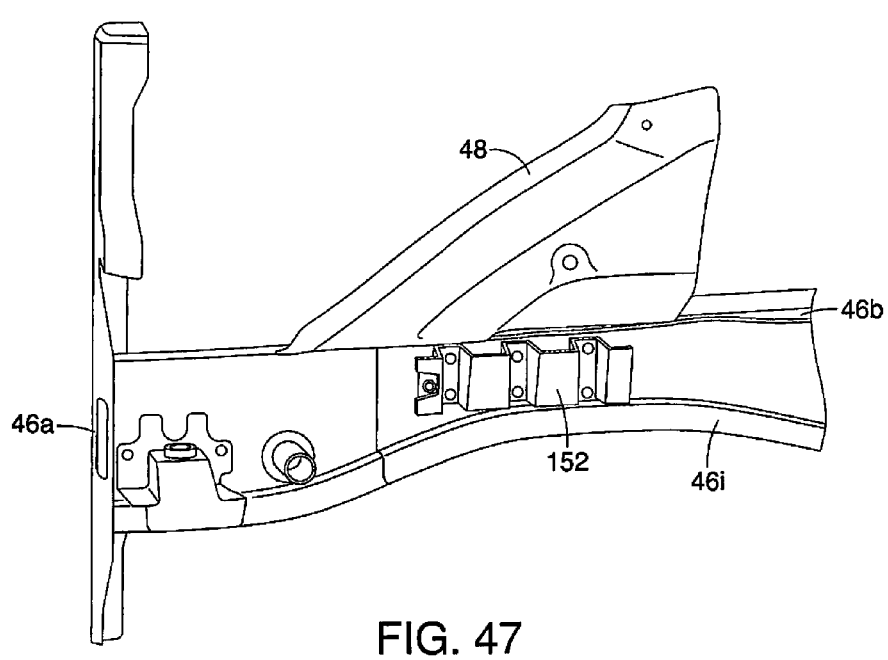
FIG. 47 is a side view of the portion of the front end structure with the outboard panel removed revealing an outboard surface of the inboard panel of the front side member, showing a reinforcement bracket disposed within the front side member in accordance with the tenth embodiment.

The front side member 46 includes a plurality of panels welded or otherwise rigidly fixed to one another to form a beam of the vehicle 10. For example, the front side member 46 includes an inboard panel 46i and an outboard panel 46o. As is indicated in FIG. 46, the inboard panel 46i and the outboard panel 46o define a space therebetween within the overall shape of the front side member 46. The front side member 46 also includes an engine assembly contact member 150 (FIGS. 48 and 49) and a reinforcement bracket 152 (FIGS. 47 and 49).

Figure 48:
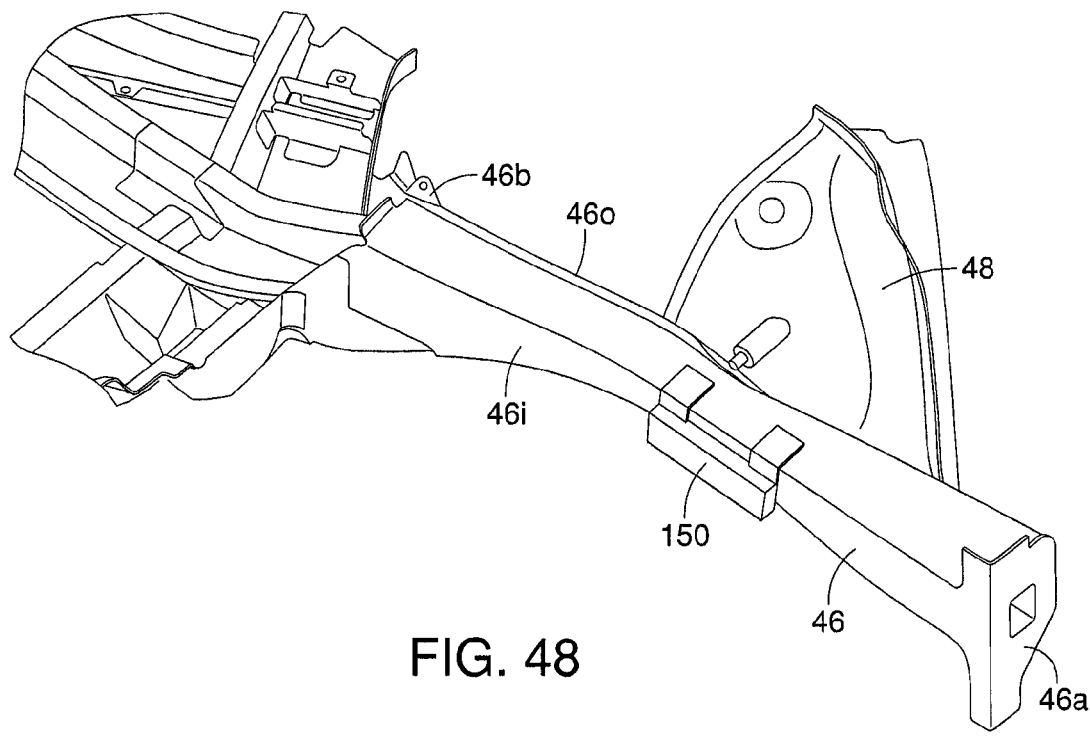
FIG. 48 is another perspective view of the portion of the front end structure showing the front side member with an engine assembly contact member located adjacent to an inboard surface of the inboard panel of the front side member and positioned to face a portion of the engine assembly, in accordance with the tenth embodiment.
Figure 49:
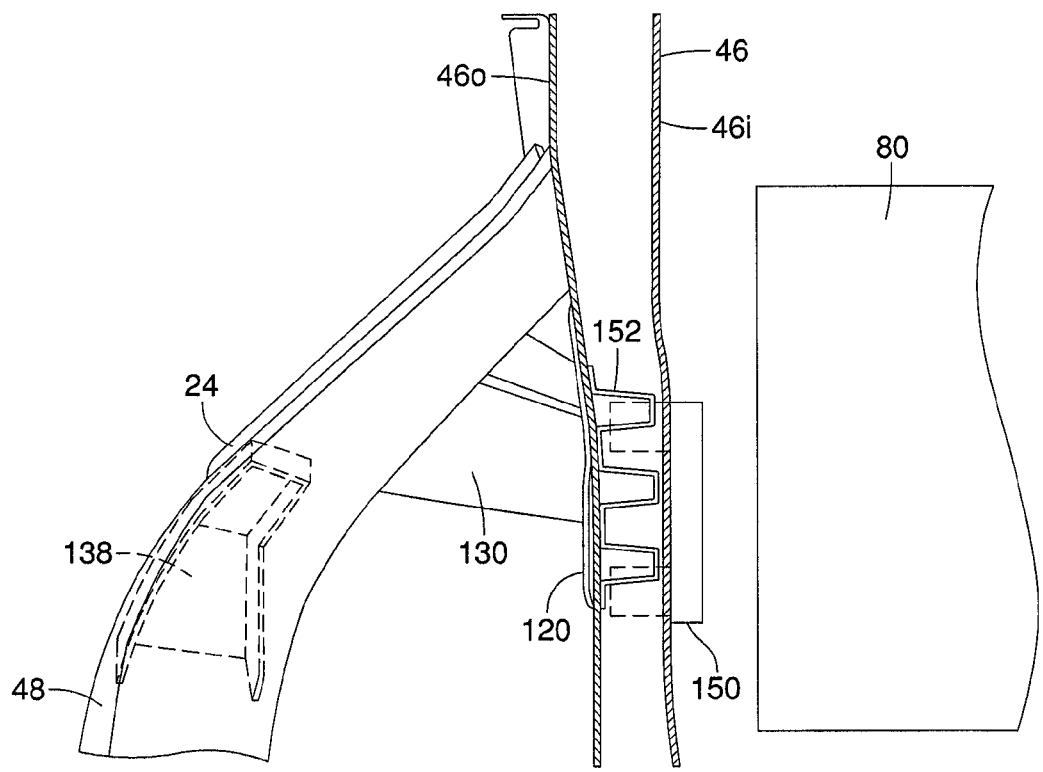
FIG. 49 is a cross-sectional view taken along the line 49-49 in FIG. 46 showing the reinforcing bracket within the front side member and the engine assembly contact member in accordance with the tenth embodiment.

The engine assembly contact member 150 is fixed to an outboard surface of the inboard panel 46i of the front side member 46, as shown in FIGS. 48 and 49. The reinforcement bracket 152 is fixed to the inboard panel 46i of the front side member 46 and is dimensioned to extend from the inboard panel 46i of the front side member 46 to the outboard panel 46o, as shown in FIG. 49. The engine assembly contact member 150 and the reinforcement bracket 152 are laterally aligned with one another, as indicated in FIG. 49. During an impact event, laterally directed forces from the hood ledge reinforcement 48 are transmitted to the front side member 46. These forces can tend to laterally deform the front side member 48. However, upon such deformation of the front side member 46, the reinforcement bracket 152 assists in maintaining the overall shape of the front side member 46 such that the lateral forces can then be directed from the front side member through the engine assembly contact member 150 to the engine assembly 80, thereby causing the vehicle 10 to move laterally during the impact event.

Figure 50:
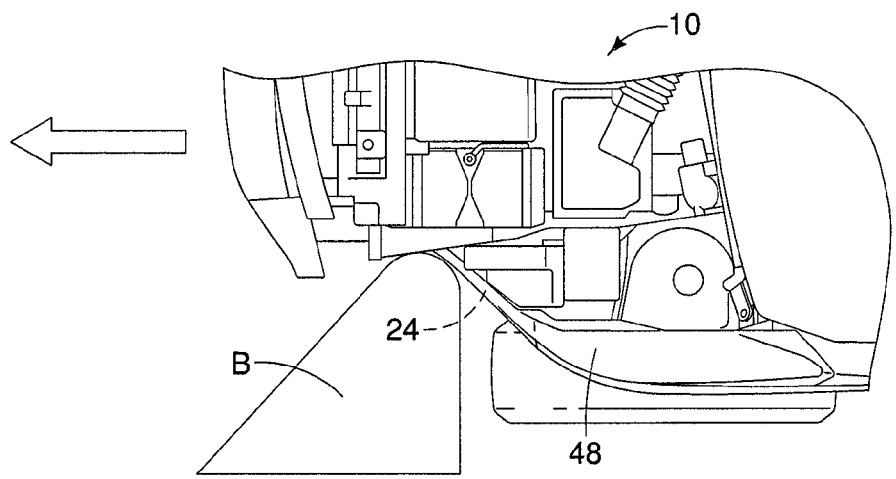
FIG. 50 is a top view of the portion of the front end structure of the vehicle depicted in FIGS. 46-49 showing the hood ledge (which conceals the lateral energy transfer member) at the moment of impact in an impact event in a small overlap test in accordance with the tenth embodiment.
Figure 51:
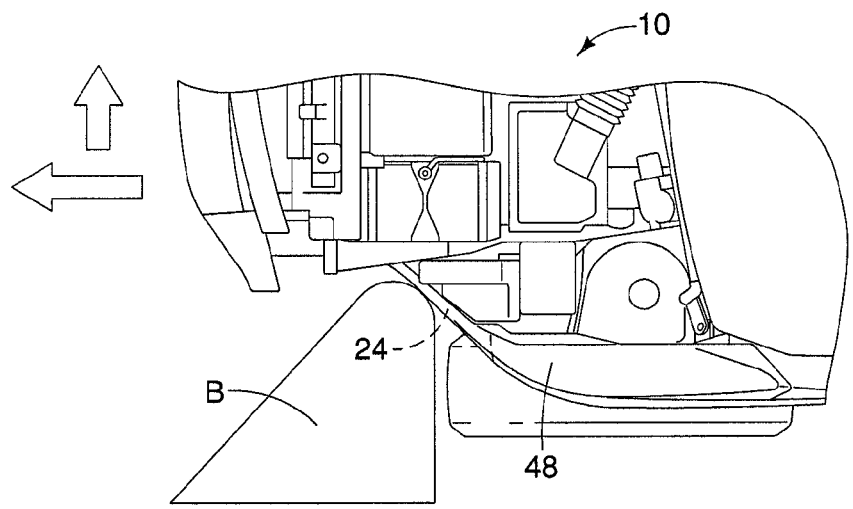
FIG. 51 is another top view similar to FIG. 50 showing the hood ledge (which conceals the lateral energy transfer member) just after impact in the impact event in the small overlap test in accordance with the tenth embodiment.
Figure 52:
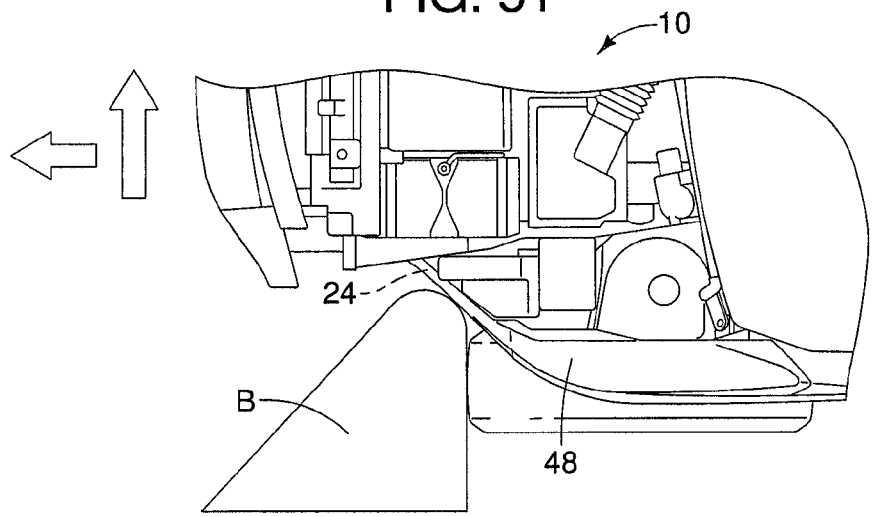
FIG. 52 is yet another top view similar to FIGS. 50 and 51 showing the hood ledge (which conceals the lateral energy transfer member) as the impact event progresses in the small overlap test showing lateral movement of the vehicle in accordance with the tenth embodiment.

The vehicle 10 achieves a similar redirection of forward velocity into lateral velocity in response to an impact event as in the first embodiment, as demonstrated schematically in FIGS. 50-52.

Eleventh Embodiment

Figure 53:
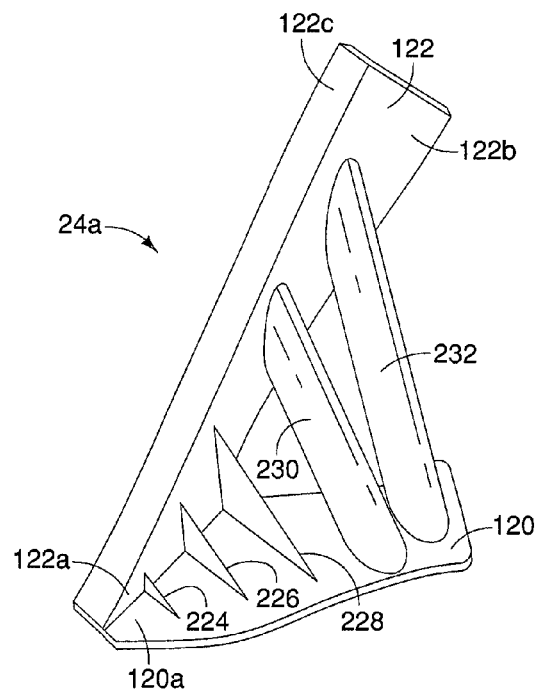
FIG. 53 is a perspective view of the hood ledge reinforcement, in accordance with an eleventh embodiment.
Figures 54, 55:
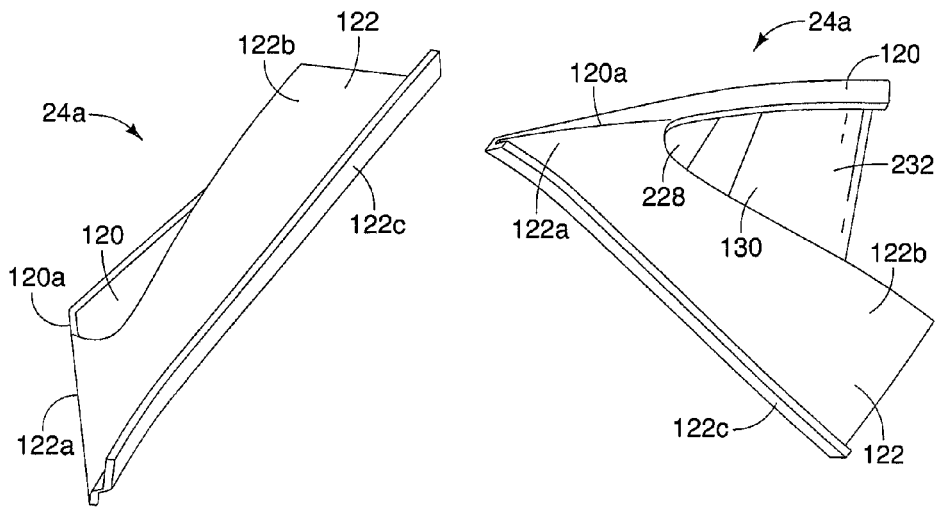
FIG. 54 is a front view of the hood ledge reinforcement, in accordance with the eleventh embodiment.
FIG. 55 is a top view of the hood ledge reinforcement, in accordance with the eleventh embodiment.

Referring now to FIG. 53-55, a hood ledge reinforcement 24a in accordance with an eleventh embodiment will now be explained. In view of the similarity between the tenth and eleventh embodiments, the parts of the eleventh embodiment that are identical to the parts of the tenth embodiment will be given the same reference numerals as the parts of the tenth embodiment. Moreover, the descriptions of the parts of the eleventh embodiment that are identical to the parts of the tenth embodiment may be omitted for the sake of brevity.

The hood ledge reinforcement 24a basically includes the lower section 120 and the upper section 122 as described in the tenth embodiment, but further include a plurality of braces 224, 226, 228, 230 and 232. The upper section 122 of the hood ledge reinforcement 24 includes a front end 122a that is fixedly attached to a front end 120a of the lower section 120 such that the lower section 120 and the upper section 122 define a V-shaped structure. More specifically, when viewed from the side, as shown in FIG. 53, the upper section 122 and lower section 120 define an acute angle therebetween. However, at the intersection of the front end 120a and the front end 122a, the upper section 122 and the lower section 120 may define a right angle, or an obtuse angle, depending upon the overall design of the body structure 30.

The braces 224, 226, 228, 230a and 232 extend between the lower section 120 and the upper section 122. More specifically, each of the braces 224, 226, 228, 230 and 232 is fixedly attached to both the lower section 120 and the upper section 122 by, for example, welding.

The upper section 122 includes a main section 122b and a peripheral flange section 122c. The peripheral flange 122c extends in a direction that is angularly offset from the main section 122b. For example, in the depicted embodiment, at most points along the length of the flange 122c, the flange 122c is perpendicular to the main section 122b. When installed to the body structure 30, the main section 122c is welded at a variety of locations to the lower surface 48d of the hood ledge 48 and the flange 122c is welded to an outboard surface of the hood ledge 48. Further, when installed to the body structure 30, the lower section 120 is welded to the outboard surface 46c of the front side member 46. In the depicted embodiment, the braces 224, 226 and 228 are basically flat metal plates or gussets welded to the lower section 120 and the upper section 122. The braces 230 and 232 are cylindrical or tube shaped elements welded to the lower section 120 and the upper section 122. As shown in the drawings, the braces 224, 226 and 228 are all fixed in position between the lower section 120 and the upper section 122 along a seam or intersection between the lower section 120 and the upper section 122. However, the braces 230 and 232 are located proximate distal ends of each of the lower section 120 and the upper section 122. In the depicted embodiment, the braces 224, 226 and 228a extend parallel to one another. However, the braces 230 and 232 can be angled relative to one another and the braces 224, 226 and 228, as indicated in FIG. 53.

Twelfth Embodiment

Figure 56:
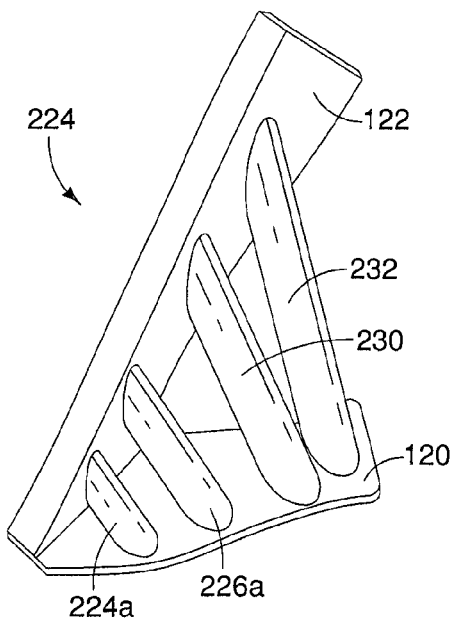
FIG. 56 is a side view of a lateral energy transfer member in accordance with an twelfth embodiment.

Referring now to FIG. 56, a hood ledge reinforcement 224 in accordance with a twelfth embodiment will now be explained. In view of the similarity between the tenth and twelfth embodiments, the parts of the twelfth embodiment that are identical to the parts of the tenth embodiment will be given the same reference numerals as the parts of the tenth embodiment. Moreover, the descriptions of the parts of the twelfth embodiment that are identical to the parts of the tenth embodiment may be omitted for the sake of brevity.

The hood ledge reinforcement 224 includes the lower section 120 and the upper section 122 of the hood ledge reinforcement 24 of the tenth embodiment. However, the brace 128 of the tenth embodiment has been replaced with cylindrically shaped braces 224a and 226a. Similarly, the brace 130 of the tenth embodiment has been replaced with cylindrically shaped braces 230 and 232.

Thirteenth Embodiment

Figure 57:
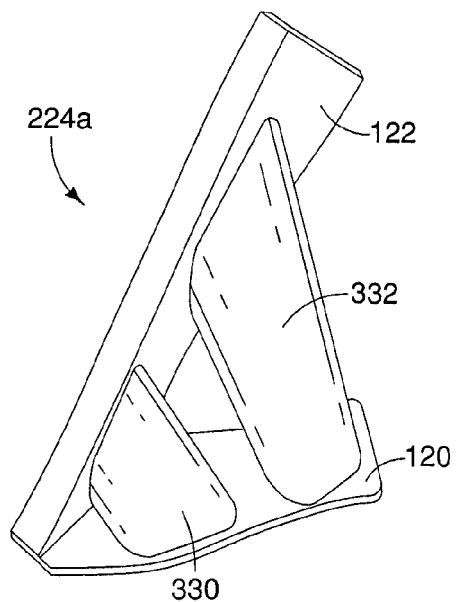
FIG. 57 is a side view of a lateral energy transfer member in accordance with a thirteenth embodiment.

Referring now to FIG. 57, a hood ledge reinforcement 224a in accordance with a thirteenth embodiment will now be explained. In view of the similarity between the tenth and thirteenth embodiments, the parts of the thirteenth embodiment that are identical to the parts of the tenth embodiment will be given the same reference numerals as the parts of the tenth embodiment. Moreover, the descriptions of the parts of the thirteenth embodiment that are identical to the parts of the tenth embodiment may be omitted for the sake of brevity.

The hood ledge reinforcement 224a includes the lower section 120 and the upper section 122 of the hood ledge reinforcement 24 of the tenth embodiment. However, the braces 128 and 130 of the tenth embodiment have been replaced with braces 330 and 332. The braces 330 and 332 have a rectangular-like shaped cross-section, with a hollow interior, but have rounded corners.

Fourteenth Embodiment

Figure 58:
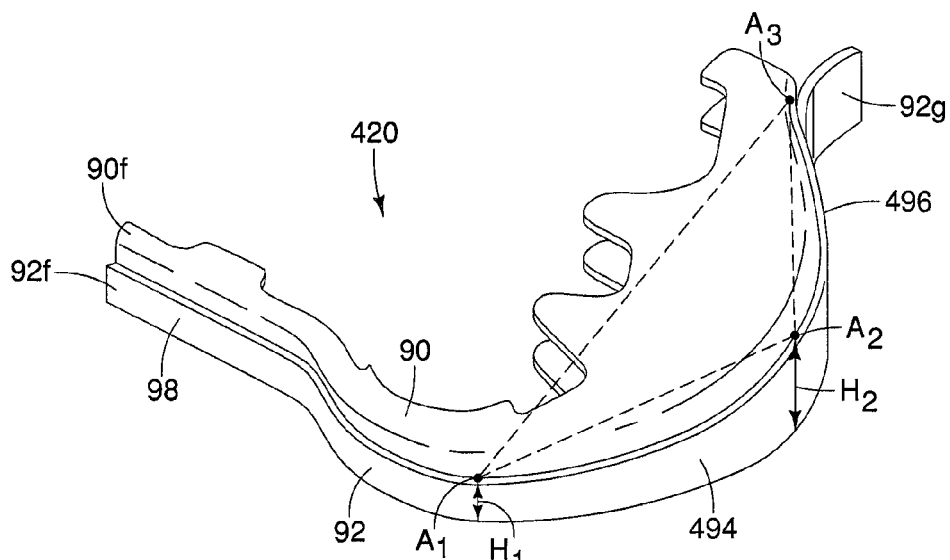
FIG. 58 is a perspective view of a force receiving member shown removed from the vehicle in accordance with a fourteenth embodiment.

Referring now to FIG. 58, a force receiving member 420 in accordance with a fourteenth embodiment will now be explained. In view of the similarity between the first and fourteenth embodiments, the parts of the fourteenth embodiment that are identical to the parts of the first embodiment will be given the same reference numerals as the parts of the first embodiment. Moreover, the descriptions of the parts of the fourteenth embodiment that are identical to the parts of the first embodiment may be omitted for the sake of brevity.

The force receiving member 420 has an arcuate force receiving surface 494 extending from the first apex $A_1$ to the second apex $A_2$, and an arcuate force directing section 496 extending from the second apex $A_2$ to the third apex $A_3$. The arcuate force receiving surface 494 and the arcuate force directing section 496 form a continuous curvilinear profile from the first apex $A_1$ to the third apex $A_3$, such that the force receiving member 420 is disc shaped. Alternatively, the upper portion 90 and/or lower portion 92 of the force receiving member 420 can also form a continuous curvilinear profile, such that the force receiving member 420 can be sphere shaped.

Fifteenth Embodiment

Figure 59:
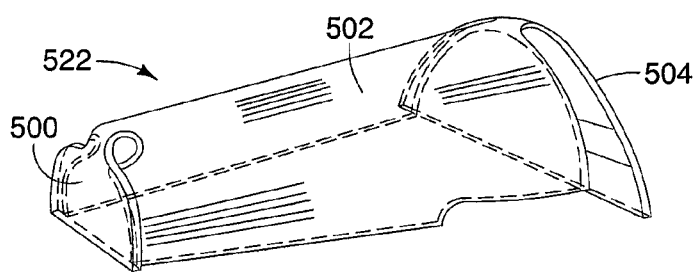
FIG. 59 is a perspective view of a lateral energy transfer member shown removed from the engine cradle in accordance with a fifteenth embodiment.

Referring now to FIG. 59, a lateral energy transfer member 522 in accordance with a fifteenth embodiment will now be explained. In view of the similarity between the first and fifteenth embodiments, the parts of the fifteenth embodiment that are identical to the parts of the first embodiment will be given the same reference numerals as the parts of the first embodiment. Moreover, the descriptions of the parts of the fifteenth embodiment that are identical to the parts of the first embodiment may be omitted for the sake of brevity.

The lateral energy transfer member 522 includes an outboard side section 500, a main section 502 and an inboard side section 506. The outboard side section 500 is similar to the outboard side section 100 of the lateral energy transfer member 22 of the first embodiment, except that it has a rounded or arcuate shape. The main section 502 has a curved shape that defines a half cylinder or tube shape. The outboard end of the main section 502 has a diameter that is smaller than a diameter of the inboard end of the main section 502. However, the inboard and outboard ends of the main section 502 can have identical diameters, making the main section 502 a half-cylinder shape, rather than a half frustoconical shape. The inboard side section 506 is generally the same as the inboard side section 106 of the lateral energy transfer member 22, but has rounded or arcuate shape. It is also contemplated that the lateral energy transfer member 522 can be formed such that the outboard side section 500, the main section 502 and the inboard side section 506 either define a hollow cavity therein, or a solid cylinder or half cylinder shaped body.

The various elements and features of the vehicle 10 not described above are conventional components that are well known in the art. Since these elements and features are well known in the art, these structures will not be discussed or illustrated in detail herein. Rather, it will be apparent to those skilled in the art from this disclosure that the components can be any type of structure that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle front end structure. Accordingly, these terms, as utilized to describe the present invention should be interpreted relative to a vehicle equipped with the vehicle front end structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle front end structure comprising:
   a front side member having a front end and a forward section proximate the front end, the front side member extending in a vehicle longitudinal direction;
   a hood ledge having a forward end fixedly attached to the forward section of the front side member, the hood ledge extending upwardly and laterally outward from the forward section of the front side member in a vehicle rearward direction; and
   a hood ledge reinforcement including a lower section fixedly attached to a lateral outboard side surface of the front side member, an upper section fixedly attached to an underside of the hood ledge, and at least one brace fixedly attached to the lower and upper sections.

2. The vehicle front end structure according to claim 1, wherein
   a front end of the upper section of the hood ledge reinforcement is directly connected to and fixedly attached to a front end of the lower section, with the lower section and the upper section defining a V-shaped structure.

3. The vehicle front end structure according to claim 2, wherein
   an intersection of the lower section and the upper section defines a seam therebetween, the lower section and the upper section is attached along the seam and the at least one brace is fixed in position between the lower section and the upper section across the seam.

4. The vehicle front end structure according to claim 1, wherein
   the upper section and lower section define an acute angle therebetween.

5. The vehicle front end structure according to claim 1, wherein
   the at least one brace includes a first brace that extends from proximate a distal end of the lower section to proximate a distal end of the upper section.

6. The vehicle front end structure according to claim 5, wherein
   the first brace comprises a hollow tube.

7. The vehicle front end structure according to claim 5, wherein
   the at least one brace includes a second brace located between the first brace and respective front ends of the lower and upper sections, the second brace extending between and being fixedly attached to the lower section and the upper section.

8. The vehicle front end structure according to claim 7, wherein
   the second brace comprises a hollow tube.

9. The vehicle front end structure according to claim 7, wherein
   the second brace comprises a flat plate or gusset.

10. The vehicle front end structure according to claim 7, wherein
    the second brace extends parallel to the first brace.

11. The vehicle front end structure according to claim 1, wherein
    the lower section of the hood ledge reinforcement has an upper edge that is horizontally oriented with the hood ledge reinforcement installed to the front side member and the hood ledge.

12. The vehicle front end structure according to claim 1, wherein
    the lower section of the hood ledge reinforcement extends in a vehicle longitudinal direction with the hood ledge reinforcement installed to the front side member and the hood ledge.

13. The vehicle front end structure according to claim 12, wherein
    the upper section of the hood ledge reinforcement extends upward and laterally away from the forward section of the front side member with the hood ledge reinforcement installed to the front side member and the hood ledge.

14. The vehicle front end structure according to claim 1, wherein
    the upper section of the hood ledge reinforcement extends upward and laterally away from the forward section of the front side member with the hood ledge reinforcement installed to the front side member and the hood ledge.

15. The vehicle front end structure according to claim 1, wherein
    the at least one brace has a box-like structure.

16. The vehicle front end structure according to claim 1, wherein
    the upper section of the hood ledge reinforcement includes a flange that extends along an outboard surface of the hood ledge.

17. The vehicle front end structure according to claim 1, wherein
    the hood ledge includes an internal reinforcement concealed within the hood ledge, and
    a portion of the upper section of the hood ledge reinforcement extends adjacent to the internal reinforcement in the vehicle longitudinal direction.

18. The vehicle front end structure according to claim 1, further comprising
    an engine assembly contact member positioned on a lateral inboard side of the front side member in alignment with the lower section of the hood ledge reinforcement.

* * * * *